US006652619B2

(12) United States Patent
Omori et al.

(10) Patent No.: US 6,652,619 B2
(45) Date of Patent: Nov. 25, 2003

(54) NIOBIUM POWDER, SINTERED BODY THEREOF, AND CAPACITOR USING THE SAME

(75) Inventors: Kazuhiro Omori, Kanagawa (JP); Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 09/925,686

(22) Filed: Aug. 10, 2001

(65) Prior Publication Data

US 2002/0064476 A1 May 30, 2002

Related U.S. Application Data

(60) Provisional application No. 60/297,441, filed on Jun. 13, 2001, provisional application No. 60/275,467, filed on Mar. 14, 2001, provisional application No. 60/269,855, filed on Feb. 21, 2001, and provisional application No. 60/240,828, filed on Oct. 17, 2000.

(30) Foreign Application Priority Data

| Aug. 10, 2000 | (JP) | ...... 2000-243486 |
| Dec. 19, 2000 | (JP) | ...... 2000-384720 |
| Mar. 9, 2001 | (JP) | ...... 2001-065852 |
| Jun. 8, 2001 | (JP) | ...... 2001-174018 |

(51) Int. Cl.[7] .............. B22F 1/00; B22F 3/00; H01G 9/042
(52) U.S. Cl. .......... 75/255; 75/245; 148/513; 361/523
(58) Field of Search ........ 75/255, 245; 148/206, 148/237, 513; 361/523

(56) References Cited

U.S. PATENT DOCUMENTS

| 3,849,124 A | * | 11/1974 | Villani ............... 420/417 |
| 3,867,129 A | * | 2/1975 | Ronneau et al. ........ 75/255 |
| 4,512,805 A | * | 4/1985 | Albrecht et al. ........ 361/305 |
| 6,136,062 A | * | 10/2000 | Loffelholz et al. ....... 75/228 |
| 6,171,363 B1 | * | 1/2001 | Shekhter et al. ........ 75/369 |
| 6,231,689 B1 | * | 5/2001 | Fife ................. 148/281 |
| 6,402,066 B1 | * | 6/2002 | Habecker et al. ....... 241/21 |
| 6,409,796 B1 | * | 6/2002 | Surpin ............... 75/255 |

FOREIGN PATENT DOCUMENTS

| JP | 48-25859 | 4/1973 |
| JP | 55-157226 A | 12/1980 |
| JP | 55-157226 | 12/1980 |
| JP | 56-45015 | 4/1981 |
| JP | 10-242004 | 9/1998 |
| JP | 10-340831 | 12/1998 |

OTHER PUBLICATIONS

Japanese language International Search Report for PCT/JP01/06857 dated Nov. 13, 2001.

* cited by examiner

*Primary Examiner*—Ngoclan Mai
(74) *Attorney, Agent, or Firm*—Sughrue Mion, PLLC

(57) ABSTRACT

A niobium powder comprising at least one element selected from the group consisting of chromium, molybdenum, tungsten, boron, aluminum, gallium, indium, thallium, cerium, neodymium, titanium, rhenium, ruthenium, rhodium, palladium, silver, zinc, silicon, germanium, tin, phosphorus, arsenic, bismuth, rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium; a sintered body of the niobium powder; and a capacitor comprising a sintered body as one electrode, a dielectric material formed on the surface of the sintered body, and counter electrode provided on the dielectric material.

36 Claims, No Drawings

NIOBIUM POWDER, SINTERED BODY THEREOF, AND CAPACITOR USING THE SAME

CROSS-REFERENCE TO RELATED APPLICATIONS

This application is based on the provisions of 35 U.S.C. Article 111(a) with claiming the benefit of filing dates of U.S. provisional applications Ser. Nos. 60/240,828 filed on Oct. 17, 2000, 60/269,855 filed on Feb. 21, 2001, 60/275,467 filed on Mar. 14, 2001, 60/297,441 filed on Jun. 13, 2001, under the provisions of 35 U.S.C. 111(b), pursuant to 35 U.S.C. Article 119(e) (1).

TECHNICAL FIELD

The present invention relates to a niobium powder with a large capacitance per unit weight and good leakage current characteristics, a sintered body using the above-mentioned niobium powder, and a capacitor using the above-mentioned sintered body.

BACKGROUND ART

Capacitors for use in electronic apparatus such as portable telephones and personal computers are required to be small in size and large in capacitance. Of those capacitors, a tantalum capacitor is preferably used, because the capacitance is large, not in proportion to the size, and the tantalum capacitor also has good characteristics. The tantalum capacitor usually employs a sintered body of a tantalum powder as an anode. In order to increase the capacitance of the tantalum capacitor, it is necessary to increase the weight of the sintered body, or to use a sintered body having an increased surface area obtained by pulverizing the tantalum powder.

The increase in weight of the sintered body inevitably enlarges the shape, so that the requirement for a small-sized capacitor is not satisfied. On the other hand, when the tantalum powder is finely pulverized to increase the specific surface area, the pore size in the tantalum sintered body decreases, and the number of closed pores increases during the sintering step. The result is that the sintered body cannot be easily impregnated with a cathode agent in the subsequent step.

One approach to solve these problems is a capacitor using a sintered body of a powder material which has a greater dielectric constant than the tantalum powder. One powder material which has such a greater dielectric constant is a niobium powder.

Japanese Laid-Open Patent Application No. 55-157226 discloses a method for producing a sintered element for a capacitor. This method comprises the steps of subjecting a niobium powder ranging from an agglomerate to fine particles with a particle diameter of 2.0 $\mu$m or less to pressure molding and sintering, finely cutting the molded sintered body, connecting a lead portion to the finely cut particles of the sintered body, and thereafter sintering the connected body. However, the above-mentioned application does not describe the detailed characteristics of the obtained capacitor.

U.S. Pat. No. 4,084,965 discloses a capacitor using a sintered body of a niobium powder with a particle size of 5.1 $\mu$m obtained from a niobium ingot through hydrogenation and pulverizing. The capacitor disclosed has, however, a high leakage current value (hereinafter referred to as an LC value), and therefore the serviceability is poor.

As disclosed in Japanese Laid-Open Patent Application No. 10-242004, the LC value is improved by partially nitriding a niobium powder. However, when a capacitor having a large capacitance is produced using a sintered body of a niobium powder with a smaller particle diameter, the LC value of the obtained capacitor may become exceptionally high.

U.S. Pat. No. 6,051,044 discloses a niobium powder which has a particular BET specific surface area and contains nitrogen in a particular amount. A method for decreasing the leakage current is also disclosed. However, there is no disclosure nor suggestion concerning a niobium powder containing another element which can form an alloy with niobium. Furthermore, this patent does not disclose nor suggest the heat resistance necessary for capacitors in soldering and the like or stability of LC value against thermal history.

DISCLOSURE OF INVENTION

An object of the present invention is to provide a niobium powder capable of providing a capacitor having good heat resistance with a large capacitance per unit weight and a small leakage current value, a sintered body using the above-mentioned niobium powder, and a capacitor using the above-mentioned sintered body.

Through intense studies of the above-mentioned problems, the inventors of the present invention have found that a low LC value and good heat resistance can be maintained even in a capacitor provided with a large capacitance by decreasing the particle diameter of a niobium powder when at least one element selected from various elements which can form an alloy with niobium is added to niobium. The present invention has thus been accomplished. The term "alloy" in the present application includes a solid solution with the other alloy components. Namely, the present invention basically provides a niobium powder of the below (1) to (29), a sintered body of (30) to (31) obtained by sintering the niobium powders, a capacitor of (32) to (42), a process for producing niobium powders of (43) to (46), an electronic circuit of (47) and an electronic instrument of (48).

(1) A niobium powder for capacitors comprising at least one element selected from the group consisting of chromium, molybdenum, tungsten, boron, aluminum, gallium, indium, thallium, cerium, neodymium, titanium, rhenium, ruthenium, rhodium, palladium, silver, zinc, silicon, germanium, tin, phosphorus, arsenic, bismuth, rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium.

(2) The niobium powder for capacitors as described in 1 above comprising at least one element selected from the group consisting of chromium, molybdenum and tungsten.

(3) The niobium powder for capacitors as described in 2 above, wherein said at least one element is tungsten.

(4) The niobium powder for capacitors as described in 2 above, wherein said at least one element is chromium and tungsten.

(5) The niobium powder for capacitors as described in 1 above comprising at least one element selected from the group consisting of boron, aluminum, gallium, indium and thallium.

(6) The niobium powder for capacitors as described in 5 above, wherein said at least one element is boron.

(7) The niobium powder for capacitors as described in 5 above, wherein said at least one element is aluminum.

(8) The niobium powder for capacitors as described in 1 above comprising at least one element selected from the group consisting of cerium, neodymium, titanium, rhenium, ruthenium, rhodium, palladium, silver, zinc, silicon, germanium, tin, phosphorus, arsenic and bismuth.

(9) The niobium powder for capacitors as described in 8 above comprising at least one element selected from the group consisting of rhenium, zinc, arsenic, phosphorus, germanium, tin and neodymium.

(10) The niobium powder for capacitors as described in 9 above, wherein said at least one element is rhenium.

(11) The niobium powder for capacitors as described in 9 above, wherein said at least one element is neodymium.

(12) The niobium powder for capacitors as described in 9 above, wherein said at least one element is zinc.

(13) The niobium powder for capacitors as described in 1 above comprising at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium.

(14) The niobium powder for capacitors as described in 13 above comprising at least one element selected from the group consisting of lanthanum, yttrium, erbium, ytterbium and lutetium.

(15) The niobium powder for capacitors as described in 14 above, wherein said at least one element is lanthanum.

(16) The niobium powder for capacitors as described in 14 above, wherein said at least one element is yttrium.

(17) The niobium powder as described in any one of 1 to 16 above, wherein said at least one element is contained in an amount of about 10 mol % or less in said niobium powder.

(18) The niobium powder as described in 17 above, wherein said at least one element is contained in an amount of about 0.01 to about 10 mol % in said niobium powder.

(19) The niobium powder as described in 18 above, wherein said at least one element is contained in an amount of about 0.1 to about 7 mol % in said niobium powder.

(20) The niobium powder as described in any one of 1 to 16 above, wherein said niobium powder has a mean particle size of about 0.05 $\mu$m to about 5 $\mu$m.

(21) The niobium powder as described in 20 above, wherein said niobium powder has a mean particle size of about 0.2 $\mu$m to about 4 $\mu$m.

(22) The niobium powder as described in any one of 1 to 16 above, wherein said niobium powder has a BET specific surface area of about 0.5 to about 40 m$^2$/g.

(23) The niobium powder as described in 22 above, wherein said niobium powder has a BET specific surface area of about 1 to about 20 m$^2$/g.

(24) The niobium powder as described in any one of 2, 3, 4, 7, 3, 9, 10, 11, 12, 13, 14, 15 and 16 above, further comprising at least one element selected from the group consisting of nitrogen, carbon, boron, and sulfur.

(25) The niobium powder as described in 5 or 6 above, further comprising at least one element selected from the group consisting of nitrogen, carbon and sulfur.

(26) The niobium powder as described in 24 or 25 above, wherein at least one element selected from the group consisting of nitrogen, carbon, boron and sulfur is contained in an amount of about 200,000 ppm or less.

(27) The niobium powder as described in 26 above, wherein at least one element selected from the group consisting of nitrogen, carbon, boron, and sulfur is contained in an amount of about 50 ppm to about 200,000 ppm.

(28) A niobium granulated product prepared by granulating said niobium powder as described in any one of 1 to 27 above to have a mean particle size of 10 $\mu$m to 500 $\mu$m.

(29) The niobium granulated product as described in 28 above, wherein the mean particle size is about 30 $\mu$m to about 250 $\mu$m.

(30) A sintered body using said niobium powder as described in any one of 1 to 27 above.

(31) A sintered body using said niobium granulated product as described in 28 or 29 above.

(32) A capacitor comprising an electrode using said niobium sintered body as described in 30 or 31 above, a dielectric formed on a surface of said electrode, and a counter electrode formed on said dielectric.

(33) The capacitor as described in 32 above, wherein said dielectric comprises niobium oxide as a main component.

(34) The capacitor as described in 33 above, wherein said niobium oxide is prepared by electrolytic oxidation.

(35) The capacitor as described in 32 above, wherein said counter electrode comprises at least one material selected from the group consisting of an electrolytic solution, an organic semiconductor, and an inorganic semiconductor.

(36) The capacitor as described in 32 above, wherein said counter electrode comprises an organic semiconductor, which comprises at least one material selected from the group consisting of an organic semiconductor comprising benzopyrroline tetramer and chloranil, an organic semiconductor comprising tetrathiotetracene as the main component, an organic semiconductor comprising tetracyanoquinodimethane as the main component, and an electroconducting polymer.

(37) The capacitor as described in 36 above, wherein said electroconducting polymer is at least one selected from the group consisting of polypyrrole, polythiophene, polyaniline, and substituted compounds thereof.

(38) The capacitor as described in 36 above, wherein said electroconducting polymer is prepared by doping a polymer comprising a repeat unit represented by general formula (1) or (2) with a dopant:

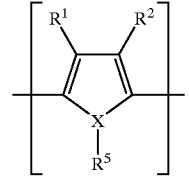

(1)

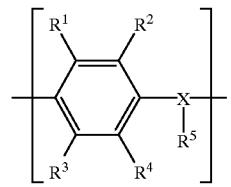

(2)

wherein R$^1$ to R$^4$ which may be the same or different, each independently represents a monovalent group selected from the group consisting of a hydrogen atom, a straight-chain or branched alkyl group, alkoxyl group, or alkylester group, having 1 to 10 carbon atoms, which may be saturated or unsaturated, a halogen atom, a nitro group, a cyano group, a primary, secondary or tertiary amino group, a CF$_3$ group, and a substituted or unsubstituted phenyl group, and R$^1$ and R$^2$, and R$^3$ and R$^4$ may independently form in combination a bivalent chain constituting a saturated or unsaturated hydrocarbon cyclic structure of at least one 3- to 7-membered ring together with carbon atoms undergoing substitution by combining hydrocarbon chains represented by $R^1$ and $R^2$ or $R^3$ and $R^4$ at an arbitrary position, in which a linkage of carbonyl, ether, ester, amide, sulfide, sulfinyl, sulfonyl, or imino may be included at an arbitrary position in the cyclic combined chain; X is an oxygen atom, a sulfur atom, or a nitrogen atom; and $R^5$, which is present only when X represents a nitrogen atom, is independently a hydrogen atom, or a straight-chain or branched alkyl group having 1 to 10 carbon atoms, which may be saturated or unsaturated.

(39) The capacitor as described in 38 above, wherein said electroconducting polymer comprises a repeat unit represented by general formula (3):

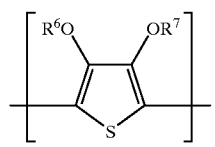

(3)

wherein $R^6$ and $R^7$ which may be the same or different, each independently represents a hydrogen atom, a straight-chain or branched alkyl group having 1 to 6 carbon atoms, which may be saturated or unsaturated, or a substituent group constituting a cyclic structure of a saturated hydrocarbon of at least one 5- to 7-membered ring including two oxygen atoms by combining the alkyl groups represented by $R^6$ and $R^7$ at an arbitrary position, in which a substituted or unsubstituted vinylene linkage or a substituted or unsubstituted phenylene structure may be included in the cyclic structure.

(40) The capacitor as described in 39 above, wherein said electroconducting polymer comprising said repeat unit represented by formula (3) is poly(3,4-ethylenedioxythiophene).

(41) The capacitor as described in 36 above, wherein said counter electrode comprises organic semiconductor having a laminated structure.

(42) The capacitor as described in 36 above, wherein said counter electrode is organic semiconductor material which contains an organic sulfonic acid anion as a dopant.

(43) A method for producing the niobium powder comprising nitrogen as described in 24 or 25 above, wherein the niobium powder is subjected to surface treatment using at least one process selected from the group consisting of liquid nitridation, ion nitridation and gas nitridation.

(44) A method for producing the niobium powder comprising carbon as described in 24 or 25 above, wherein the niobium powder is subjected to surface treatment using at least one process selected from the group consisting of gas carbonization, solid-phase carbonization and liquid carbonization.

(45) A method for producing the niobium powder comprising boron as described in 24 above, wherein the niobium powder is subjected to surface treatment using at least one process selected from the group consisting of gas boronization and solid-phase boronization.

(46) A method for producing the niobium powder comprising sulfur as described in 24 or 25 above, wherein the niobium powder is subjected to surface treatment using at least one process selected from the group consisting of gas sulfidation, ion sulfidation and solid-phase sulfidation.

(47) An electronic circuit using the capacitor described in any one of 32 to 42 above.

(48) An electronic instrument using the capacitor described in any one of 32 to 42 above.

DETAILED DESCRIPTION OF THE INVENTION

The capacitor of the present invention which has a large capacitance and good leakage current characteristics, niobium powder and sintered body thereof which attribute to those good capacitor characteristics will be explained with regard to the following four groups ((1)-(4)):

(1) The niobium powder for capacitors comprising at least one element selected from the group consisting of chromium, molybdenum and tungsten, and the sintered body thereof (The first group of the invention);

(2) The niobium powder for capacitors comprising at least one element selected from the group consisting of boron, aluminum, gallium, indium and thallium, and the sintered body thereof (The second group of the invention);

(3) The niobium powder for capacitors comprising at least one element selected from the group consisting of cerium, neodymium, titanium, rhenium, ruthenium, rhodium, palladium, silver, zinc, silicon, germanium, tin, phosphorus, arsenic and bismuth, and the sintered body thereof (The third group of the invention); and (4) The niobium powder for capacitors comprising at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium, and the sintered body thereof (The fourth group of the invention).

(1) The First Group (Niobium Powder and Sintered Body)

The first group of the present invention relates to a niobium powder and a sintered body thereof, wherein the niobium powder contains at least one element selected from the transition elements of group VI in the periodic table, that is, chromium, molybdenum, and tungsten.

Chromium, molybdenum, and tungsten are elements that can form an alloy with niobium. The most effective for lowering the leakage current value is tungsten, while molybdenum and chromium follow in that order. It is therefore most preferable that the niobium powder of the first group of the present invention contains tungsten. Such a tungsten-containing niobium powder may further comprise molybdenum and/or chromium, preferably chromium. The total amount of these elements may be about 10 mol % or less, preferably in the range of about 0.01 mol % to about 10 mol %, more preferably in the range of about 0.1 mol % to about 7 mol % in the niobium powder.

According to the present invention, it is preferable to use a sintered body of a niobium powder for a capacitor, with the niobium powder containing at least one element selected from the group consisting of chromium, molybdenum, and tungsten in an amount of about 10 mol % or less, more preferably in the range of about 0.01 mol % to about 10 mol % of the niobium powder.

If the content of the above-mentioned element is less than about 0.01 mol %, it is impossible to inhibit the tendency whereby oxygen in a dielectric film formed by electrolytic oxidation, to be described later, is apt to diffuse into the niobium metal side. Consequently, the stability of a film obtained by electrolytic oxidation, i.e., dielectric film, cannot be maintained, so that the LC value cannot be effectively lowered. If the content of the above-mentioned element is more than about 10 mol %, the amount of niobium itself in the niobium powder decreases. As a result, the capacitance of the capacitor decreases.

In light of the above, the most preferable amount of at least one element selected from the group consisting of chromium, molybdenum, and tungsten is in the range of about 0.01 to about 10 mol %. In order to further reduce the leakage current value, it is preferable that the above-mentioned element be contained in an amount of about 3 mol % or less, and more preferably in the range of about 0.05 to about 3 mol % in the niobium powder.

It is preferable that the niobium powder have a mean particle size (mean particle diameter) of about 5 $\mu$m or less, and more preferably about 4 $\mu$m or less to increase the specific surface area of the powder. Most preferably, the mean particle diameter of the niobium powder of the present invention may be about 0.2 $\mu$m or more and about 5 $\mu$m or less. The reason for this is as follows.

The capacitance C of a capacitor is generally expressed by the following equation:

$$C = \in \times (S/d),$$

wherein C represents the capacitance, $\in$ represents the dielectric constant, S represents the specific surface area, and d represents the distance between electrodes.

Since d=k×V, wherein k is a constant and V represents the forming voltage, C=∈×(S/(k×V)); hence, it follows that C×V=(∈/k)×S.

In view of the equation, the capacitance of the capacitor can be increased merely by increasing the specific surface area. Assuming that the niobium powder has a spherical shape, the smaller the particle diameter of the niobium powder, the larger the capacitance of the obtained capacitor. However, in fact, the niobium powder is not in a completely spherical shape, and occasionally contains flake-shaped particles.

As described above, the characteristics required for the capacitor of the present invention are not only a large capacitance but also good leakage current properties. This cannot be achieved simply by enlarging the specific surface area of the powder.

According to the present invention, by using a niobium powder containing at least one element selected from the group consisting of chromium, molybdenum, and tungsten as a raw material to produce a sintered body, it becomes possible to provide a capacitor capable of satisfying both the above-mentioned capacitor characteristics, and a niobium sintered body that can provide such capacitor characteristics.

TABLE 1 shows the particle diameter and the specific surface area of respective tungsten-containing niobium powders which the inventors of the present invention prepared through pulverizing as one embodiment.

TABLE 1

| Mean Particle Size ($D_{50}$) | Specific Surface Area (S) |
| --- | --- |
| 5 $\mu$m | 0.6 m$^2$/g |
| 2 $\mu$m | 1.3 m$^2$/g |
| 0.9 $\mu$m | 2.3 m$^2$/g |
| 0.5 $\mu$m | 4.2 m$^2$/g |
| 0.2 $\mu$m | 10.0 m$^2$/g |
| 0.1 $\mu$m | 20.8 m$^2$/g |
| 0.05 $\mu$m | 38.8 m$^2$/g |

The mean particle size herein used is a value $D_{50}$, which represents a particle diameter, measured using a particle size distribution measuring apparatus "Microtrac" (trademark), made by Microtrac Corporation, when the mass percentage reaches 50% by cumulative distribution by mass. The specific surface area is a value measured by the BET method.

When the mean particle size of the niobium powder containing at least one element selected from the group consisting of chromium, molybdenum, and tungsten is less than about 0.05 $\mu$m, a sintered body made from the niobium powder has a small pore size and has many closed pores. Therefore, there is a tendency for the sintered body to be not easily impregnated with an agent for cathode as described later. The result is that the capacitance of the obtained capacitor cannot be increased, and therefore, the above-mentioned sintered body is not suitable for capacitors. When the mean particle size exceeds about 5 $\mu$m, a large capacitance cannot be obtained.

In light of the above-mentioned points, a large capacitance can be obtained in the present invention by employing a niobium powder preferably having a mean particle size of about 0.05 $\mu$m or more and about 5 $\mu$m or less.

It is preferable that the niobium powder of the present invention have a BET specific surface area of at least about 0.5 m$^2$/g, more preferably at least about 1.0 m$^2$/g, and further preferably at least about 2.0 m$^2$/g. In addition, it is preferable that the niobium powder of the present invention be a powder with a BET specific surface area of about 0.5 to about 40 m$^2$/g, more preferably about 1 to about 20 m$^2$/g, and particularly preferably about 1 to about 10 m$^2$/g.

It is known that the dielectric constant ($\in$) of niobium is about two times greater than that of tantalum. However, it is not known whether chromium, molybdenum, or tungsten is a valve metal that is one of the capacitor characteristics. Therefore it has not been known that the dielectric constant $\in$ of the niobium powder containing at least one element selected from the group consisting of chromium, molybdenum, and tungsten will increase.

In the present invention, when the niobium powder containing at least one element selected from the group consisting of chromium, molybdenum, and tungsten is controlled to have a small mean particle size and is made into a sintered body with a large capacitance, as mentioned above, there is no peculiar increase in the LC value.

This action is assumed to be as follows. The bonding strength between niobium and oxygen is greater than that between tantalum and oxygen. Therefore, oxygen in a film prepared by electrolytic oxidation, i.e., a dielectric film, tends to diffuse into the side of a niobium metal. However, because part of the niobium and at least one element of chromium, molybdenum, or tungsten are bonded together in the sintered body of the present invention, there is less chance for oxygen in the electrolytic oxidation film to be bonded to niobium, thereby preventing oxygen from diffusing into the metal.

As a result, it is possible to maintain the stability of the electrolytic oxidation film, and therefore, it is considered that the effect of decreasing the LC value and minimizing the dispersion of the LC value can be obtained in a capacitor with a high capacitance prepared from the niobium powder with a small particle diameter.

The present invention will now be described by taking tungsten as an example of the transition elements of the group VI in the periodic table. The present invention is not limited to this example, but also applies to the case where chromium or molybdenum is used.

It is particularly preferable that the tungsten-containing niobium powder used to prepare a sintered body have a mean particle size of about 0.2 $\mu$m or more and about 5 $\mu$m or less as mentioned above.

The tungsten-containing niobium powder having such a mean particle size can be prepared from, for example, a hydride of a niobium—tungsten alloy in the form of an ingot, pellet, or powder through pulverizing and dehydrogenation. Alternatively, a niobium powder prepared by subjecting a hydride of a niobium ingot, pellet, or powder to pulverizing and dehydrogenation, or by pulverizing a sodium reduced form of potassium fluoroniobate, is mixed with tungsten carbide, tungsten oxide, or tungsten powder. Or, a mixture of niobium oxide and tungsten oxide may be subjected to carbon reduction.

For example, when the tungsten-containing niobium powder is prepared from a hydride of a niobium—tungsten alloy ingot through pulverizing and dehydrogenation, a tungsten-containing niobium powder with a desired mean particle size can be obtained by adjusting the content of hydride in the niobium—tungsten alloy, and the pulverizing time and a pulverizer.

Further, a niobium powder with a mean particle size of from about 0.2 $\mu$m or more to about 5 $\mu$m or less may be added to the tungsten-containing niobium powder thus obtained. The niobium powder to be added can be prepared, for example, by pulverizing a sodium reduced form of potassium fluoroniobate, or subjecting a hydride of a niobium ingot to pulverizing and dehydrogenation, or by subjecting niobium oxide to carbon reduction.

In order to further improve the leakage current value in a sintered body of the obtained tungsten-containing niobium powder, the tungsten-containing niobium powder may be partially bonded to at least one of nitrogen, carbon, boron, or sulfur. Any of the tungsten-containing niobium nitride, tungsten-containing niobium carbide, tungsten-containing niobium boride, and tungsten-containing niobium sulfide, resulting from the bonding to nitrogen, carbon, boron, and sulfur, respectively may be added alone, or the two to four kinds may be selectively contained.

The amount of element for bonding, that is, the total content of carbon, nitrogen, boron, and sulfur, which depends upon the shape of the tungsten-containing niobium powder, may be more than 0 ppm and not more than about 200,000 ppm, preferably in the range of about 50 ppm to about 100,000 ppm, and more preferably about 200 ppm to about 20,000 ppm when the tungsten-containing niobium powder has a mean particle size from about 0.05 $\mu$m to about 5 $\mu$m. When the total content exceeds about 200,000 ppm, the capacitance characteristics deteriorate to such an extent that the niobium powder becomes unsuitable for a capacitor.

Nitridation of the tungsten-containing niobium powder can be performed by any of liquid nitridation, ion nitridation, or gas nitridation, or by a combination of those methods. Gas nitridation under a nitrogen gas atmosphere is preferred because the system can be made simple and the operation can be made easy.

For example, according to gas nitridation under a nitrogen atmosphere, the tungsten-containing niobium powder may be allowed to stand under a nitrogen gas atmosphere. The tungsten-containing niobium powder partially nitrided to a desired extent can be obtained at a nitriding atmosphere temperature of about 2000° C. or less within about one hundred hours. An increase in processing temperature can curtail the processing time.

The tungsten-containing niobium powder can be carbonized by any method of gas carbonization, solid-phase carbonization, or liquid carbonization. For example, the tungsten-containing niobium powder may be allowed to stand together with a carbon source of a carbon-containing organic material such as a carbon material or methane at about 2000° C. or less under reduced pressure for about one minute to about one hundred hours.

The tungsten-containing niobium powder can be borided by gas boronization or solid-phase boronization. For example, the tungsten-containing niobium powder may be allowed to stand together with a boron source such as boron pellets or boron halide, i.e., trifluoroboron under reduced pressure at temperatures of about 2000° C. or less for about one minute to about one hundred hours.

The tungsten-containing niobium powder can be sulfided by any of gas sulfidation, ion sulfidation, or solid-phase sulfidation. For example, according to gas sulfidation under a sulfur gas atmosphere, the tungsten-containing niobium powder may be allowed to stand under a sulfur atmosphere. The tungsten-containing niobium powder sulfided to a desired extent can be obtained at temperatures of about 2000° C. or less and a standing time of about one hundred hours or less. The higher the processing temperature, the shorter the processing time.

According to the present invention, the tungsten-containing niobium powder can be used for a capacitor after granulation to have a desired configuration. Alternatively, the granulated powder may be mixed with a proper amount of ungranulated niobium powder after granulation.

With respect to the granulation method, the tungsten-containing niobium powder not subjected to granulation is allowed to stand under high vacuum, heated to an appropriate temperature, and then subjected to cracking. Alternatively, the tungsten-containing niobium powder not subjected to granulation is mixed with an appropriate binder such as camphor, polyacrylic acid, poly(methyl acrylate), or poly(vinyl alcohol), and a solvent such as acetone, alcohol, acetate, or water, and thereafter the resulting mixture is subjected to cracking.

The tungsten-containing niobium powder thus granulated can improve pressure-moldability in the preparation of a sintered body. In this case, it is preferable that the granulated powder have a mean particle size of about 10 $\mu$m to about 500 $\mu$m. When the mean particle size of the granulated powder is about 10 $\mu$m or less, partial blocking takes place, which degrades the flowability toward a mold. When the granulated powder has a mean particle size of about 500 $\mu$m or more, an angular portion of a molded article is easily chipped off after pressure molding. Granulated powders have preferably a mean particle size of about 30 $\mu$m to about 250 $\mu$m, and particularly preferably of about 60 $\mu$m to about 250 $\mu$m because the sintered body is easily impregnated with a negative electrode material after pressure molding of the niobium powder in the production of a capacitor.

The above-mentioned nitridation, carbonization, boronization, and sulfidation can be carried out, not only for the niobium powder, but also for the granulated niobium powder and for the niobium sintered body.

The tungsten-containing niobium sintered body for a capacitor according to the present invention is produced by sintering the aforementioned tungsten-containing niobium powder or the granulated tungsten-containing niobium powder. An example of a method for producing the sintered body will be described later, but does not limit the present invention. For instance, a tungsten-containing niobium powder is subjected to pressure molding to have a predetermined shape, and the molded material is heated at about 500° C. to about 2000° C., preferably about 900° C. to about 1500° C., and more preferably about 900° C. to about 1300° C. under the application of a pressure of $10^{-5}$ to $10^{2}$ Pa (pascal) for about one minute to about ten hours.

(2) The Second Group (Niobium Powder and Sintered Body)

In the second group of the present invention, a niobium powder comprising at least one element selected from the group consisting of boron, aluminum, gallium, indium and thallium is used as a starting material of the niobium powder.

The boron, aluminum, gallium, indium and thallium for use in the present invention are elements capable of forming an alloy with niobium and among these, boron and aluminum have an effect of most reducing the leakage current and next effective are gallium, indium and thallium in this order. Accordingly, in the present invention, boron or aluminum is particularly preferably incorporated into the niobium powder. The boron-containing niobium powder may further contain aluminum, gallium, indium and thallium. The total content of these elements in the niobium powder is about 10 mol % or less, preferably from about 0.01 to about 10 mol % and more preferably from about 0.1 to about 7 mol %. In other words, the niobium powder formed into a sintered body and used for a capacitor in the present invention preferably contains at least one element selected from the group consisting of boron, aluminum, gallium, indium and thallium, in the range of about 10 mol % or less, more preferably from about 0.01 to about 10 mol % and particularly preferably about 0.1 to about 7 mol %.

If the content of the element is less than about 0.01 mol %, oxygen in the dielectric film formed by the electrolytic oxidation which is described later cannot be inhibited from diffusing toward the internal niobium metal side, as a result, the stability of the electrolytic oxide film (the dielectric film) cannot be maintained and the effect of reducing LC can be hardly obtained. On the other hand, if the content of the element exceeds about 10 mol %, the content of the niobium itself in the niobium powder is reduced, as a result, the capacitance as a capacitor decreases.

Accordingly, the content of at least one element selected from the group consisting of the boron, aluminum, gallium, indium and thallium is preferably from about 0.01 to about 10 mol %. In order to more reduce the leakage current, the content of the element in the niobium powder is preferably about 7 mol % or less, more preferably from about 0.10 to about 7 mol %.

In order to increase the specific surface area of powder, the niobium powder of the present invention preferably has a mean particle size of about 5 μm or less, more preferably about 4 μm or less. Also, the mean particle size of the niobium powder of the present invention is preferably from about 0.05 to about 4 μm. The reasons therefor are described above with regard to the niobium powder of the first group.

In the present invention, the starting material niobium powder used for manufacturing a sintered body is a niobium powder comprising at least one element selected from the group consisting of boron, aluminum, gallium, indium and thallium, whereby a capacitor satisfying both of the above-described properties or a niobium sintered body capable of ensuring those capacitor properties can be provided.

The mean particle size ($D_{50}$, μm) and the specific surface area (S, m$^2$/g) of a boron-containing niobium powder manufactured as one example by the present inventors (produced by a pulverization method) are shown in Table 2 below.

TABLE 2

| Mean Particle Size ($D_{50}$) (μm) | Specific Surface Area (S) (m$^2$/g) |
| --- | --- |
| 5.0 | 0.60 |
| 2.0 | 1.3 |
| 0.9 | 2.4 |
| 0.5 | 4.3 |
| 0.2 | 10.0 |
| 0.1 | 20.9 |
| 0.05 | 39.2 |

The mean particle size ($D_{50}$; μm) shown in Table 2 above is a value measured using a particle size distribution measuring apparatus ("Microtrac", trade name, manufactured by Microtrac Company) (the $D_{50}$ value indicates a particle size when the cumulative % by mass corresponds to 50% by mass). The specific surface area is a value measured by the BET method.

If the mean particle size of the niobium powder comprising at least one element selected from the group consisting of boron, aluminum, gallium, indium and thallium exceeds about 5 μm, a capacitor having a large capacitance cannot be obtained, whereas if the mean particle size is less than about 0.05 μm, the pore size becomes small and closed pores increase when a sintered body is produced from the powder, therefore, a cathode material which is described later cannot be easily impregnated, as a result, the niobium powder cannot provide a capacitor having a large capacitance and the sintered body thereof is not suitable for use in a capacitor.

From these reasons, the niobium powder for use in the present invention preferably has a mean particle size of about 0.05 to about 4 μm, whereby a large-capacitance capacitor can be obtained.

The niobium powder of the present invention is preferably a powder having a BET specific surface area of at least about 0.5 m$^2$/g, more preferably at least about 1 m$^2$/g, and still more preferably at least about 2 m$^2$/g. Also, the niobium powder of the present invention preferably has a BET specific surface area of about 0.5 to about 40 m$^2$/g, more preferably from about 1 to about 20 m$^2$/g and particularly preferably from about 1 to about 10 m$^2$/g.

With respect to the dielectric constant ($\in$), niobium is known to have a dielectric constant as large as about two times the dielectric constant of tantalum, however, whether or not boron, gallium, indium and thallium are a valve metal having capacitor properties is not known. Aluminum is a valve acting metal but the dielectric constant thereof is known to be smaller than that of niobium. Accordingly, even when at least one element selected from the group consisting of boron, aluminum, gallium, indium and thallium is incorporated into niobium, it is not known whether $\in$ of the niobium powder containing the element increases.

According to the investigations by the present inventors, even when the niobium powder is reduced in the mean particle size and a sintered body having a high capacitance is manufactured therefrom, the LC value is not peculiarly increased insofar as at least one element of boron, aluminum, gallium, indium and thallium is contained.

The reasons for this result are presumed as follows.

Niobium has a high bonding strength to an oxygen element as compared with tantalum and therefore, oxygen in the electrolytic oxide film (dielectric material film) is liable to diffuse toward the internal niobium metal side, however, in the sintered body of the present invention, a part of niobium is bonded to at least one element of boron, aluminum, gallium, indium and thallium and therefore, oxygen in the electrolytic oxide film is not easily bonded to the internal niobium metal and inhibited from diffusing toward the metal side, as a result, the stability of the electrolytic oxide film can be maintained and an effect of reducing the LC value and the dispersion thereof even in the case of a capacitor having a fine particle size and a high capacitance can be attained.

The present invention is described below using boron as an example, however, the present invention is not limited thereto and the following content can be applied also to the cases using aluminum, gallium, indium or thallium.

A boron-containing niobium power for use in the manufacture of a sintered body preferably has a mean particle size of about 0.05 to about 4 μm as described above.

The boron-containing niobium powder having such a mean particle size can be obtained, for example, by a method of pulverizing and dehydrogenating a hydride of a niobium-boron alloy ingot, pellet or powder.

The boron-containing niobium powder can also be obtained by a method of mixing boric acid, boron oxide and boron powder with a niobium powder formed by pulverizing and dehydrogenating a hydride of a niobium ingot, pellet or powder, by pulverizing a sodium reduction product of potassium fluoroniobate or by pulverizing a reduction product resulting from reducing a niobium oxide using at least one member of hydrogen, carbon, magnesium, aluminum, or by a method of carbon-reducing a mixture of niobium oxide and boron oxide.

For example, in the case of obtaining a niobium powder by pulverizing and dehydrogenating a hydride of a niobium-boron alloy ingot, a boron-containing niobium powder having a desired mean particle size can be obtained by controlling the amount of the niobium-boron alloy ingot hydrogenated, the pulverization time, the grinding machine or the like. The thus-obtained boron-containing niobium powder may be mixed with a niobium powder having a mean particle size of about 5 μm or less to adjust the boron content. The niobium powder added here may be obtained, for example, by a method of pulverizing a sodium reduction product of potassium fluoroniobate, a method of pulverizing and dehydrogenating a hydroxide of a niobium ingot, a method of reducing a niobium oxide using at least one member of hydrogen, carbon, magnesium and aluminum, or a method of hydrogen-reducing a niobium halide.

In order to further improve the leakage current value of the thus-obtained boron-containing niobium powder, a part of the boron-containing niobium powder may be surface-treated by nitridation, carbonization, sulfidation and further boronization. The powder may comprise any of these products obtained by the surface-treatment of nitridation, carbonization, sulfidation or boronization, more specifically, the powder may comprise any of boron-containing niobium nitride, boron-containing niobium carbide, boron-containing niobium sulfide and boron-containing niobium boride. The powder may also comprise two, three or four of these products in combination.

The sum total of the bonding amounts, that is, the total content of nitrogen, carbon, boron and sulfur varies depending on the shape of the boron-containing niobium powder, however, in the case of a powder having a mean particle size of approximately from about 0.05 to about 5 μm, the total content is more than 0 ppm and not more than about 200,000 ppm, preferably from about 50 to about 200,000 ppm, more preferably from about 200 to about 20,000 ppm. If the total content exceeds about 200,000 ppm, the capacitance characteristics are deteriorated and the fabricated product is not suitable as a capacitor.

The nitridation of the boron-containing niobium powder can be performed by any one of liquid nitridation, ion nitridation and gas nitridation or by a combination thereof. Among these, gas nitridation in a nitrogen gas atmosphere is preferred because the apparatus therefor is simple and the operation is easy. For example, the gas nitridation in a nitrogen gas atmosphere can be attained by allowing the above-described boron-containing niobium powder to stand in a nitrogen gas atmosphere. With an atmosphere temperature of about 2,000° C. or less and a standing time of about one hundred hours or less, a boron-containing niobium powder having an objective nitrided amount can be obtained. The treatment time can be shortened by performing this treatment at a higher temperature.

The carbonization of the boron-containing niobium powder may be any one of gas carbonization, solid-phase carbonization and liquid carbonization. For example, the boron-containing niobium powder may be carbonized by allowing it to stand together with a carbon material or a carbon source such as an organic material having carbon (e.g., methane), at about 2,000° C. or less under reduced pressure for about one minute to about one hundred hours.

The sulfidation of the boron-containing niobium powder may be any one of gas sulfidation, ion sulfidation and solid-phase sulfidation. For example, the gas sulfidation in a sulfur gas atmosphere can be attained by allowing the boron-containing niobium powder to stand in a sulfur atmosphere. With an atmosphere temperature of 2,000° C. or less and a standing time of about one hundred hours or less, a boron-containing niobium powder having an objective sulfudized amount can be obtained. The treatment time can be shortened by performing the treatment at a higher temperature.

The boronization of the boron-containing niobium powder may be either gas boronization or solid-phase boronization. For example, the boron-containing niobium powder may be boronized by allowing it to stand together with a boron source such as boron pellet or boron halide (e.g., trifluoroboron), at about 2,000° C. or less for about one minute to about one hundred hours under reduced pressure.

The boron-containing niobium powder for capacitors of the present invention may be used after granulating the boron-containing niobium powder into an appropriate shape or may be used by mixing an appropriate amount of non-granulated niobium powder after the above-described granulation.

Examples of the granulation method include a method where non-granulated boron-containing niobium powder is allowed to stand in a high vacuum, heated to an appropriate temperature and then cracked, and a method where non-granulated boron-containing niobium powder is mixed with an appropriate binder such as camphor, polyacrylic acid, polymethyl acrylic acid ester or polyvinyl alcohol, and a solvent such as acetone, alcohols, acetic acid esters or water, and then cracked.

The boron-containing niobium powder granulated as such is improved in the press-molding property at the production of a sintered body. The mean particle size of the granulated powder is preferably from about 10 to about 500 μm. If the mean particle size of the granulated powder is less than about 10 μm, partial blocking takes place and the fluidity into a metal mold deteriorates, whereas if it exceeds about 500 μm, the molded article after the press-molding is readily broken at the corner parts. The mean particle size of the granulated powder is more preferably from about 30 to about 250 µm because a cathode agent can be easily impregnated at the manufacture of a capacitor after sintering the press-molded article.

The boron-containing niobium sintered body for capacitors of the present invention is produced by sintering the above-described boron-containing niobium powder or granulated boron-containing niobium powder. The production method for the sintered body is not particularly limited, however, the sintered body may be obtained, for example, by press-molding the boron-containing niobium powder into a predetermined shape and then heating it at about 500 to about 2,000° C., preferably from about 900 to about 1,500° C., more preferably from about 900 to about 1,300° C., for about one minute to about ten hours under a pressure of $10^{-5}$ to $10^2$ Pa.

(3) The Third Group (Niobium Powder and Sintered Body)

In the third group of the present invention, a niobium powder comprising at least one element selected from the group consisting of cerium, neodymium, titanium, rhenium, ruthenium, rhodium, palladium, silver, zinc, silicon, germanium, tin, phosphorus, arsenic and bismuth can used as a starting material of the niobium powder.

The cerium, neodymium, titanium, rhenium, ruthenium, rhodium, palladium, silver, zinc, silicon, germanium, tin, phosphorus, arsenic and bismuth are elements capable of forming an alloy with niobium. In particular, a niobium powder comprising at least one element selected from the group consisting of rhenium, neodymium, zinc, arsenic, phosphorus, germanium and tin is preferred, and a niobium powder comprising at least one element selected from the group consisting of rhenium, neodymium and zinc is more preferred.

In one embodiment, the niobium powder is, for example, a rhenium-containing niobium powder comprising at least one element of cerium, neodymium, titanium, ruthenium, rhodium, palladium, silver, zinc, silicon, germanium, tin, phosphorus, arsenic and bismuth. In the present invention, the total content of these elements in the niobium powder is about 10 mol % or less, preferably from about 0.01 to about 10 mol %, more preferably from about 0.1 to about 7 mol %.

If the total content of the element is less than about 0.01 mol %, oxygen in the dielectric film formed by the electrolytic oxidation which is described later cannot be inhibited from diffusing toward the niobium metal side, as a result, the stability of the electrolytic oxide film (the dielectric film) cannot be maintained and the effect of reducing LC can be hardly obtained. On the other hand, if the total content of the element exceeds about 10 mol %, the content of the niobium itself in the niobium powder is reduced, as a result, the capacitance as a capacitor decreases.

Accordingly, the total content of at least one element selected from the group consisting of cerium, neodymium, titanium, rhenium, ruthenium, rhodium, palladium, silver, zinc, silicon, germanium, tin, phosphorus, arsenic and bismuth is preferably from about 0.01 to about 10 mol %.

In order to more reduce the leakage current, the content of the element in the niobium powder is preferably about 7 mol % or less, more preferably from about 0.1 to about 7 mol %.

In order to increase the specific surface area of powder, the niobium powder of the present invention preferably has a mean particle size of about 5 µm or less, more preferably about 4 µm or less. Also, the mean particle size of the niobium powder is preferably from about 0.05 to about 4 µm. The reasons therefor are described above with regard to the niobium powder of the first group.

In the present invention, the starting material niobium powder used for manufacturing a sintered body is a niobium powder comprising at least one element selected from the group consisting of cerium, neodymium, titanium, rhenium, ruthenium, rhodium, palladium, silver, zinc, silicon, germanium, tin, phosphorus, arsenic and bismuth, whereby a capacitor satisfying both of the above-described properties or a niobium sintered body capable of ensuring those capacitor properties can be provided.

The mean particle size ($D_{50}$, µm) and the specific surface area (S, m$^2$/g) of a rhenium-containing niobium powder manufactured as one example by the present inventors (produced by a pulverization method) are shown in Table 3 below.

TABLE 3

| Mean Particle Size ($D_{50}$) (µm) | Specific Surface Area (S) (m$^2$/g) |
|---|---|
| 4.9 | 0.63 |
| 2.0 | 1.3 |
| 0.9 | 2.6 |
| 0.5 | 4.9 |
| 0.2 | 11.0 |
| 0.1 | 20.7 |
| 0.05 | 38.4 |

The mean particle size ($D_{50}$; µm) shown in Table 3 is a value measured using a particle size distribution measuring apparatus ("Microtrac", trade name, manufactured by Microtrac Company) (the $D_{50}$ value indicates a particle size when the cumulative % by mass corresponds to 50% by mass). The specific surface area is a value measured by the BET method.

If the mean particle size of the niobium powder comprising at least one element selected from the group consisting of cerium, neodymium, titanium, rhenium, ruthenium, rhodium, palladium, silver, zinc, silicon, germanium, tin, phosphorus, arsenic and bismuth exceeds about 5 µm, a capacitor having a large capacitance cannot be obtained, whereas if the mean particle size is less than about 0.05 µm, the pore size becomes small and closed pores increase when a sintered body is produced from the powder, therefore, a cathode material which is described later cannot be easily impregnated, as a result, the niobium powder cannot provide a capacitor having a large capacitance and the sintered body thereof is not suitable for use in a capacitor.

From these reasons, the niobium powder for use in the present invention preferably has a mean particle size of about 0.05 to about 5 µm, whereby a large-capacitance capacitor can be obtained.

The niobium powder of the present invention is preferably a powder having a BET specific surface area of at least about 0.5 m$^2$/g, more preferably at least about 1 m$^2$/g, and still more preferably at least about 2 m$^2$/g. Also, the niobium powder of the present invention preferably has a BET specific surface area of about 0.5 to about 40 m$^2$/g, more preferably from about 1 to about 20 m$^2$/g and particularly preferably from about 1 to about 10 m$^2$/g.

With respect to the dielectric constant ($\in$), niobium is known to have a dielectric constant as large as about two times the dielectric constant of tantalum, however, whether cerium, neodymium, titanium, rhenium, ruthenium, rhodium, palladium, silver, zinc, silicon, germanium, tin, phosphorus, arsenic and bismuth are a valve metal having capacitor properties is not known. Accordingly, even when at least one element selected from the group consisting of cerium, neodymium, titanium, rhenium, ruthenium, rhodium, palladium, silver, zinc, silicon, germanium, tin, phosphorus, arsenic and bismuth is incorporated into niobium, it is not known whether ∈ of the niobium powder containing the element increases.

According to the investigations by the present inventors, even when the niobium powder is reduced in the mean particle size and a sintered body having a high capacitance is manufactured therefrom, the LC value is not peculiarly increased insofar as at least one element of cerium, neodymium, titanium, rhenium, ruthenium, rhodium, palladium, silver, zinc, silicon, germanium, tin, phosphorus, arsenic and bismuth is contained.

The reasons for this result are presumed as follows.

Niobium has a high bonding strength to an oxygen element as compared with tantalum and therefore, oxygen in the electrolytic oxide film (dielectric material film) is liable to diffuse toward the internal niobium metal side, however, in the sintered body of the present invention, a part of niobium is bonded to at least one element of cerium, neodymium, titanium, rhenium, ruthenium, rhodium, palladium, silver, zinc, silicon, germanium, tin, phosphorus, arsenic and bismuth and therefore, oxygen in the electrolytic oxide film is not easily bonded to the internal niobium metal and inhibited from diffusing toward the metal side, as a result, the stability of the electrolytic oxide film can be maintained and an effect of reducing the LC value and the dispersion thereof even in the case of a capacitor having a fine particle size and a high capacitance can be attained.

The present invention is described below mainly using rhenium as an example, however, the present invention is not limited thereto and the following contents are applied also to the cases using at least one element selected from the group consisting of cerium, neodymium, titanium, rhenium, ruthenium, rhodium, palladium, silver, zinc, silicon, germanium, tin, phosphorus, arsenic and bismuth.

The rhenium-containing niobium power for use in the manufacture of a sintered body preferably has a mean particle size of about 0.05 to about 4 μm as described above.

The rhenium-containing niobium powder having such a mean particle size can be obtained, for example, by a method of pulverizing and dehydrogenating a hydride of niobium-rhenium alloy ingot, pellet or powder. The rhenium-containing niobium powder can also be obtained by a method of mixing rhenium powder or an oxide, sulfide, sulfate, halide salt, nitrate, organic acid salt or complex salt of rhenium with a niobium powder formed by pulverizing and dehydrogenating a hydride of niobium ingot, pellet or powder, by pulverizing a sodium reduction product of potassium fluoroniobate or by pulverizing a reduction product of niobium oxide reduced using at least one member of hydrogen, carbon, magnesium, aluminum and the like; or by a method of magnesium-reducing a mixture of niobium oxide and rhenium oxide.

The niobium powder containing rhenium, zinc and germanium can be obtained, for example, by a method of pulverizing and dehydrogenating a hydride of niobium-rhenium-zinc-germanium alloy ingot, pellet or powder. This niobium powder can also be obtained by a method of mixing rhenium powder, zinc powder and germanium powder, or oxides, sulfides, sulfates, halide salts, nitrates or organic acid salts of rhenium, zinc, germanium with a niobium powder formed by pulverizing and dehydrogenating a hydride of niobium ingot, pellet or powder, by pulverizing a sodium reduction product of potassium fluoroniobate or by pulverizing a reduction product of niobium oxide reduced using at least one member of hydrogen, carbon, magnesium, aluminum and the like; or by a method of magnesium-reducing a mixture of niobium oxide, rhenium oxide, zinc oxide and germanium oxide.

For example, in the case of obtaining the rhenium-containing niobium powder by pulverizing and dehydrogenating a hydride of a niobium-rhenium alloy ingot, a rhenium-containing niobium powder having a desired mean particle size can be obtained by controlling the amount of the niobium-rhenium alloy hydrogenated, the pulverization time, the grinding machine or the like.

The thus-obtained rhenium-containing niobium powder may be mixed with a niobium powder having a mean particle size of about 5 μm or less to adjust the rhenium content. The niobium powder added here may be obtained, for example, by a method of pulverizing a sodium reduction product of potassium fluoroniobate, a method of pulverizing and dehydrogenating a hydride of niobium ingot, a method of reducing a niobium oxide using at least one member of hydrogen, carbon, magnesium and aluminum, or a method of hydrogen-reducing a niobium halide. In order to further improve the leakage current value of the thus-obtained rhenium-containing niobium powder, a part of the rhenium-containing niobium powder may be surface-treated by nitridation, boronization, carbonization or sulfidation. Any of the rhenium-containing niobium nitride, rhenium-containing niobium boride, rhenium-containing niobium carbide and rhenium-containing niobium sulfide, obtained by the surface-treatment using nitridation, boronization, carbonization or sulfidation, may be contained or two, three or four thereof may also be contained in combination.

The amount bonded thereof, that is, the total content of nitrogen, boron, carbon and sulfur varies depending on the shape of the rhenium-containing niobium powder, however, in the case of powder having a mean particle size of approximately from about 0.05 to about 5 μm, the total content is more than 0 ppm and not more than about 200,000 ppm, preferably from about 50 to about 100,000 ppm, particularly preferably from about 200 to about 20,000 ppm. If the total content exceeds about 200,000 ppm, the capacitance properties are deteriorated and the fabricated product is not suitable as a capacitor.

The nitridation of the rhenium-containing niobium powder can be performed by any one of liquid nitridation, ion nitridation and gas nitridation or by a combination thereof. Among these, gas nitridation in a nitrogen gas atmosphere is preferred because the apparatus therefor is simple and the operation is easy. For example, the gas nitridation in a nitrogen gas atmosphere can be attained by allowing the above-described rhenium-containing niobium powder to stand in a nitrogen gas atmosphere. With an atmosphere temperature of 2,000° C. or less and a standing time of about one hundred hours or less, a rhenium-containing niobium powder having an objective nitrided amount can be obtained. The treatment time can be shortened by performing this treatment at a higher temperature.

The boronization of the rhenium-containing niobium powder may be either gas boronization or solid-phase boronization. For example, the rhenium-containing niobium powder may be boronized by allowing a boron-containing niobium powder to stand together with a boron source such as boron pellet or boron halide (e.g., trifluoroboron), at about 2,000° C. or less for about one minute to about one hundred hours under reduced pressure.

The carbonization of the rhenium-containing niobium powder may be any one of gas carbonization, solid-phase carbonization and liquid carbonization. For example, the rhenium-containing niobium powder may be carbonized by allowing it to stand together with a carbon source such as a carbon material or an organic material having carbon (e.g., methane), at about 2,000° C. or less for about one minute to about one hundred hours under reduced pressure.

The sulfidation of the rhenium-containing niobium powder may be any one of gas sulfidation, ion sulfidation and solid-phase sulfidation. For example, the gas sulfidation in a sulfur gas atmosphere can be attained by allowing the rhenium-containing niobium powder to stand in a sulfur atmosphere. With an atmosphere temperature of about 2,000° C. or less and a standing time of about one hundred hours or less, a rhenium-containing niobium powder having an objective sulfudized amount can be obtained. The treatment time can be shortened by performing the treatment at a higher temperature.

The rhenium-containing niobium powder for capacitors of the present invention may be used after granulating the rhenium-containing niobium powder into an appropriate shape or may be used by mixing an appropriate amount of non-granulated niobium powder after the above-described granulation.

Examples of the granulation method include a method where non-granulated rhenium-containing niobium powder is allowed to stand in a high vacuum and heated to an appropriate temperature and then the mixture is cracked, and a method where non-granulated or granulated rhenium-containing niobium powder is mixed with an appropriate binder such as camphor, polyacrylic acid, polymethyl acrylic acid ester or polyvinyl alcohol, and a solvent such as acetone, alcohols, acetic acid esters or water, and then the mixture is cracked.

The rhenium-containing niobium powder granulated as such is improved in the press-molding property at the production of a sintered body. The mean particle size of the granulated powder is preferably from about 10 to about 500 $\mu$m. If the mean particle size of the granulated powder is less than about 10 $\mu$m, partial blocking takes place and the fluidity into a metal mold deteriorates, whereas if it exceeds about 500 $\mu$m, the molded article after the press-molding is readily broken at the corner parts. The mean particle size of the granulated powder is more preferably from about 30 to about 250 $\mu$m because a cathode agent can be easily impregnated at the manufacture of a capacitor after sintering the press-molded article.

The rhenium-containing niobium sintered body for capacitors of the present invention is produced by sintering the above-described rhenium-containing niobium powder or granulated rhenium-containing niobium powder. The production method for the sintered body is not particularly limited, however, the sintered body may be obtained, for example, by press-molding the rhenium-containing niobium powder into a predetermined shape and then heating it at about 500 to about 2,000° C., preferably from about 900 to about 1,500° C., more preferably from about 900 to about 1,300° C., for about one minute for about one hundred hours under a pressure of $10^{-5}$ to $10^2$ Pa (pascal).

(4) The Fourth Invention (Niobium Powder and Sintered Body)

In the fourth group of the present invention, a niobium powder comprising at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium can used as a starting material of the niobium powder capable of satisfying the capacitor properties.

The rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium are elements capable of forming an alloy with niobium. In particular, a niobium powder comprising at least one element selected from the group consisting of lanthanum, yttrium, erbium, ytterbium and lutetium is preferred, and a niobium powder comprising at least one element selected from the group consisting of lanthanum and yttrium is more preferred.

In one embodiment, the niobium powder is, for example, a lanthanum-containing niobium powder comprising at least one element of rubidium, cesium, magnesium, strontium, barium, scandium, yttrium, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium. In the present invention, the total content of these elements in the niobium powder is about 10 mol % or less, preferably from about 0.01 to about 10 mol %, more preferably from about 0.1 to about 7 mol %.

If the total content of the element is less than about 0.01 mol %, oxygen in the dielectric film formed by the electrolytic oxidation which is described later cannot be inhibited from diffusing toward the niobium metal side, as a result, the stability of the electrolytic oxide film (the dielectric film) cannot be maintained and the effect of reducing LC can be hardly obtained. On the other hand, if the total content of the element exceeds about 10 mol %, the content of the niobium itself in the niobium powder is reduced, as a result, the capacitance as a capacitor decreases.

Accordingly, the total content of at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium is preferably from about 0.01 to about 10 mol %.

In order to more reduce the leakage current, the content of the element in the niobium powder is preferably about 7 mol % or less, more preferably from about 0.1 to about 7 mol %.

In order to increase the specific surface area of powder, the niobium powder of the present invention preferably has a mean particle size of about 5 $\mu$m or less, more preferably about 4 $\mu$m or less. Also, the mean particle size of the niobium powder is preferably from about 0.05 to about 4 $\mu$m. The reasons therefor are described above with regard to the niobium powder of the first group.

In the present invention, the starting material niobium used for manufacturing a sintered body is a niobium powder comprising at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium, whereby a capacitor satisfying both of the above-described properties or a niobium sintered body capable of ensuring those capacitor properties can be provided.

The mean particle size ($D_{50}$, $\mu$m) and the specific surface area (S, m$^2$/g) of a lanthanum-containing niobium powder manufactured as one example by the present inventors (all produced by a pulverization method) are shown in Table 4 below.

TABLE 4

| Mean Particle Size (D$_{50}$) (μm) | Specific Surface Area (S) (m$^2$/g) |
| --- | --- |
| 5.1 | 0.61 |
| 1.9 | 1.4 |
| 0.9 | 2.5 |
| 0.5 | 5.1 |
| 0.2 | 11.1 |
| 0.1 | 20.8 |
| 0.05 | 38.7 |

The mean particle size (D$_{50}$; μm) shown in Table 4 is a value measured using a particle size distribution measuring apparatus ("Microtrac", trade name, manufactured by Microtrac Company) (the D$_{50}$ value indicates a particle size when the cumulative % by mass corresponds to 50% by mass). The specific surface area is a value measured by the BET method.

If the mean particle size of the niobium powder comprising at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium exceeds about 5 μm, a capacitor having a large capacitance cannot be obtained, whereas if the mean particle size is less than about 0.05 μm, the pore size becomes small and closed pores increase when a sintered body is produced from the powder, therefore, a cathode material which is described later cannot be easily impregnated, as a result, the niobium powder cannot provide a capacitor having a large capacitance and the sintered body thereof is not suitable for use in a capacitor.

From these reasons, the niobium powder for use in the present invention preferably has a mean particle size of about 0.05 to about 5 μm, whereby a large-capacitance capacitor can be obtained.

The niobium powder of the present invention is preferably a powder having a BET specific surface area of at least about 0.5 m$^2$/g, more preferably at least about 1 m$^2$/g, and still more preferably at least about 2 m$^2$/g. Also, the niobium powder of the present invention preferably has a BET specific surface area of about 0.5 to about 40 m$^2$/g, more preferably from about 1 to about 20 m$^2$/g, and particularly preferably from about 1 to about 10 m$^2$/g.

With respect to the dielectric constant (∈), niobium is known to have a dielectric constant as large as about two times the dielectric constant of tantalum, however, whether rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium are a valve metal having capacitor properties is not known. Accordingly, even when at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium is incorporated into niobium, it is not known whether ∈ of the niobium powder containing the element increases.

According to the investigations by the present inventors, even when the niobium powder is reduced in the mean particle size and a sintered body having a high capacitance is manufactured therefrom, the LC value is not peculiarly increased insofar as at least one element of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium is contained.

The reasons for this result are presumed as follows.

Niobium has a high bonding strength to an oxygen element as compared with tantalum and therefore, oxygen in the electrolytic oxide film (dielectric material film) is liable to diffuse toward the internal niobium metal side, however, in the sintered body of the present invention, a part of niobium is bonded to at least one element of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium and therefore, oxygen in the electrolytic oxide film is not easily bonded to the internal niobium metal and inhibited from diffusing toward the metal side, as a result, the stability of the electrolytic oxide film can be maintained and an effect of reducing the LC value and the dispersion thereof even in the case of a capacitor having a fine particle size and a high capacitance can be attained.

The present invention is described below mainly using lanthanum as an example, however, the present invention is not limited thereto and the following contents are applied also to the cases using rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium.

The lanthanum-containing niobium power for use in the manufacture of a sintered body preferably has a mean particle size of about 0.05 to about 4 μm as described above.

The lanthanum-containing niobium powder having such a mean particle size can be obtained, for example, by a method of pulverizing and dehydrogenating a hydride of niobium-lanthanum alloy ingot, pellet or powder. The lanthanum-containing niobium powder can also be obtained by a method of mixing lanthanum powder or a hydride, oxide, sulfide, sulfate, halide salt, nitrate, organic acid salt or complex salt of lanthanum with a niobium powder formed by pulverizing and dehydrogenating a hydride of niobium ingot, pellet or powder, by pulverizing a sodium reduction product of potassium fluoroniobate or by pulverizing a reduction product of niobium oxide reduced using at least one member of hydrogen, carbon, magnesium, aluminum and the like; or by a method of magnesium-reducing a mixture of niobium oxide and lanthanum oxide.

The niobium powder containing lanthanum, hafnium and iridium can be obtained, for example, by a method of pulverizing and dehydrogenating a hydride of niobium-lanthanum-hafnium-iridium alloy ingot, pellet or powder. This niobium powder can also be obtained by a method of mixing lanthanum powder, hafnium powder and iridium powder, or hydrides, oxides, sulfides, sulfates, halide salts, nitrates or organic acid salts of lanthanum, hafnium and iridium with a niobium powder formed by pulverizing and dehydrogenating a hydride of niobium ingot, pellet or powder, by pulverizing a sodium reduction product of potassium fluoroniobate or by pulverizing a reduction product of niobium oxide reduced using at least one member of hydrogen, carbon, magnesium, aluminum and the like; or by a method of magnesium-reducing a mixture of niobium oxide, lanthanum oxide, hafnium oxide and iridium oxide.

For example, in the case of obtaining the lanthanum-containing niobium powder by pulverizing and dehydrogenating a hydride of a niobium-lanthanum alloy ingot, a lanthanum-containing niobium powder having a desired mean particle size can be obtained by controlling the amount of the niobium-lanthanum alloy hydrogenated, the pulverization time, the grinding machine or the like.

In the niobium ingot usually used as a starting material of the thus-obtained lanthanum-containing niobium powder, the contents of tantalum and metal element other than the elements described above (namely, rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium) each is about 1,000 ppm or less and the oxygen content is from about 3,000 to about 60,000 ppm.

These contents show the same values also in the niobium powder containing the element described above (namely, at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, selenium and tellurium).

The thus-obtained lanthanum-containing niobium powder may be mixed with a niobium powder having a mean particle size of about 5 $\mu$m or less to adjust the lanthanum content. The niobium powder added here may be obtained, for example, by a method of pulverizing a sodium reduction product of potassium fluoroniobate, a method of pulverizing and dehydrogenating a hydride of niobium ingot, a method of reducing a niobium oxide using at least one member of hydrogen, carbon, magnesium and aluminum, or a method of hydrogen-reducing a niobium halide.

The lanthanum-containing niobium powder for capacitors of the present invention may be used after granulating the lanthanum-containing niobium powder into an appropriate shape or may be used by mixing an appropriate amount of non-granulated niobium powder after the above-described granulation.

Examples of the granulation method include a method where non-granulated lanthanum-containing niobium powder is allowed to stand under highly reduced pressure, heated to an appropriate temperature and then the mixture is cracked, a method where non-granulated or granulated lanthanum-containing niobium powder is mixed with an appropriate binder such as camphor, polyacrylic acid, polymethyl acrylic acid ester or polyvinyl alcohol, and a solvent such as acetone, alcohols, acetic acid esters or water, and then the mixture is cracked, a method where non-granulated or granulated lanthanum-containing niobium powder is mixed with an appropriate binder such as camphor, polyacrylic acid, polymethyl acrylic acid ester or polyvinyl alcohol, and a solvent such as acetone, alcohols, acetic acid esters or water, the mixture is sintered under highly reduced pressure to vaporize and thereby remove the added binder and solvent through evaporation, sublimation or thermal decomposition and the sintered lanthanum-containing niobium lump is cracked, and a method where non-granulated or granulated lanthanum-containing niobium powder is mixed with barium oxide, magnesium oxide or the like and a solvent such as acetone, alcohols, acetic acid esters or water, the mixture is sintered under highly reduced pressure, and the sintered lump is cracked and then dissolved in a solution of acid such as nitric acid or hydrochloric acid or in a solution containing a chelating agent.

The lanthanum-containing niobium powder granulated as such is improved in the press-molding property at the production of a sintered body. The mean particle size of the granulated powder is preferably from about 10 to about 500 $\mu$m. If the mean particle size of the granulated powder is less than about 10 $\mu$m, partial blocking takes place and the fluidity into a metal mold deteriorates, whereas if it exceeds about 500 $\mu$m, the molded article after the press-molding is readily broken at the corner parts. The mean particle size of the granulated powder is more preferably from about 30 to about 250 $\mu$m because a cathode agent can be easily impregnated at the manufacture of a capacitor after sintering the press-molded article.

The lanthanum-containing niobium sintered body for capacitors of the present invention is produced by sintering the above-described lanthanum-containing niobium powder or granulated lanthanum-containing niobium powder. The production method for the sintered body is not particularly limited, however, the sintered body may be obtained, for example, by press-molding the lanthanum-containing niobium powder into a predetermined shape and then heating it at about 500 to about 2,000° C., preferably from about 900 to about 1,500° C., more preferably from about 900 to about 1,300° C., for about one minute to ten hours under a pressure of $10^{-5}$ to $10^2$ Pa (pascal).

In order to more improve the leakage current value of the thus-obtained lanthanum-containing niobium powder, granulated powder or sintered body, a part of the lanthanum-containing niobium powder, granulated powder or sintered body may be subjected to nitridation, boronization, carbonization, sulfidation or a plurality of these treatments.

Any of the obtained lanthanum-containing niobium nitride, lanthanum-containing niobium boride, lanthanum-containing niobium carbide and lanthanum-containing niobium sulfide may be contained or two or more thereof may also be contained in combination.

The amount bonded thereof, that is, the total content of nitrogen, boron, carbon and sulfur varies depending on the shape of the lanthanum-containing niobium powder, however, the total content is more than 0 ppm and not more than about 200,000 ppm, preferably about 50 to about 100,000 ppm, more preferably from about 200 to about 20,000 ppm. If the total content exceeds about 200,000 ppm, the capacitance properties are deteriorated and the fabricated product is not suitable as a capacitor.

The nitridation of the lanthanum-containing niobium powder, granulated powder or sintered body can be performed by any one of liquid nitridation, ion nitridation and gas nitridation or by a combination thereof. Among these, gas nitridation in a nitrogen gas atmosphere is preferred because the apparatus therefor is simple and the operation is easy. For example, the gas nitridation in a nitrogen gas atmosphere can be attained by allowing the above-described lanthanum-containing niobium powder, granulated powder or sintered body to stand in a nitrogen gas atmosphere. With an atmosphere temperature of about 2,000° C. or less and a standing time of about 100 hours or less, a lanthanum-containing niobium powder, granulated powder or sintered body having an objective nitrided amount can be obtained.

The treatment time can be shortened by performing this treatment at a higher temperature.

The boronization of the lanthanum-containing niobium powder, granulated powder or sintered body may be either gas boronization or solid-phase boronization. For example, the lanthanum-containing niobium powder, granulated powder or sintered body may be boronized by allowing it to stand together with a boron source such as boron pellet or boron halide (e.g., trifluoroboron), at about 2,000° C. or less for approximately from about 1 minute to about 100 hours under reduced pressure.

The carbonization of the lanthanum-containing niobium powder, granulated powder or sintered body may be any one of gas carbonization, solid-phase carbonization and liquid carbonization. For example, the lanthanum-containing niobium powder, granulated powder or sintered body may be carbonized by allowing it to stand together with a carbon material or a carbon source such as an organic material having carbon (e.g., methane), at about 2,000° C. or less under reduced pressure for approximately from about 1 minute to about 100 hours.

The sulfidation of the lanthanum-containing niobium powder, granulated powder or sintered body may be any one of gas sulfidation, ion sulfidation and solid-phase sulfidation. For example, the gas sulfidation in a sulfur gas atmosphere can be attained by allowing the lanthanum-containing niobium powder, granulated powder or sintered body to stand in a sulfur atmosphere. With an atmosphere temperature of about 2,000° C. or less and a standing time of about 100 hours or less, a niobium powder, granulated powder or sintered body having an objective sulfudized amount can be obtained. The treatment time can be shortened by performing the treatment at a higher temperature.

(5) Capacitor Device

The manufacture of a capacitor device is described below.

For example, a lead wire comprising a valve-acting metal such as niobium or tantalum and having appropriate shape and length is prepared and this lead wire is integrally molded at the press-molding of the niobium powder such that a part of the lead wire is inserted into the inside of the molded article, whereby the lead wire is designed to work out to a leading line of the sintered body.

Using this sintered body as one of the electrodes, a capacitor can be manufactured by interposing a dielectric material between this one of the electrodes and the other electrode (counter electrode). The dielectric material used here for the capacitor is preferably a dielectric material mainly comprising niobium oxide. The dielectric material mainly comprising niobium oxide can be obtained, for example, by chemically forming the lanthanum-containing niobium sintered body as one part electrode in an electrolytic solution. For chemically forming the lanthanum-containing niobium electrode in an electrolytic solution, an aqueous protonic acid solution is generally used, such as aqueous about 0.1% phosphoric acid solution or aqueous sulfuric acid solution, or about 1% acetic acid solution or aqueous adipic acid solution. In the case of chemically forming the lanthanum-containing niobium electrode in an electrolytic solution to obtain a niobium oxide dielectric material, the capacitor of the present invention is an electrolytic capacitor and the lanthanum-containing niobium electrode serves as an anode.

In the capacitor of the present invention, the other electrode (counter electrode) to the niobium sintered body is not particularly limited and, for example, at least one material (compound) selected from electrolytic solutions, organic semiconductors and inorganic semiconductors known in the art of aluminum electrolytic capacitor, may be used.

Specific examples of the electrolytic solution include a dimethylformamide-ethylene glycol mixed solution having dissolved therein about 5% by mass of an isobutyltripropylammonium borotetrafluoride electrolyte, and a propylene carbonate-ethylene glycol mixed solution having dissolved therein about 7% by mass of tetraethylammonium borotetrafluoride.

Specific examples of the organic semiconductor include an organic semiconductor comprising a benzenepyrroline tetramer and chloranile, an organic semiconductor mainly comprising tetrathiotetracene, an organic semiconductor mainly comprising tetracyanoquinodimethane, and an electrically conducting polymer comprising a repeating unit represented by formula (1) or (2):

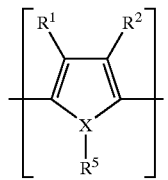

(1)

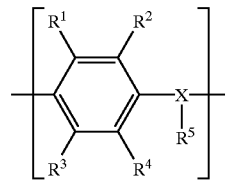

(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; each of the pairs $R^1$ and $R^2$, and $R^3$ and $R^4$ may combine at an arbitrary position to form a divalent chain for forming at least one 3-, 4-, 5-, 6- or 7-membered saturated or unsaturated hydrocarbon cyclic structure together with the carbon atoms substituted by $R^1$ and $R^2$ or by $R^3$ and $R^4$; the cyclic bond chain may contain a bond of carbonyl, ether, ester, amide, sulfide, sulfinyl, sulfonyl and imino at an arbitrary position; X represents an oxygen atom, a sulfur atom or a nitrogen atom; $R^5$ is present only when X is a nitrogen atom and independently represents hydrogen or a linear or branched, saturated or unsaturated alkyl group having from 1 to 10 carbon atoms.

In the present invention, $R^1$ to $R^4$ of formula (1) or (2) each independently preferably represents a hydrogen atom, a linear or branched, saturated or unsaturated alkyl or alkoxy group having from 1 to 6 carbon atoms, and each of the pairs $R^1$ and $R^2$, and $R^3$ and $R^4$ may combine with each other to form a ring.

In the present invention, the electrically conducting polymer comprising a repeating unit represented by formula (1) above is preferably an electrically conducting polymer comprising a structure unit represented by the following formula (3) as a repeating unit:

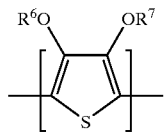

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms resulting from the alkyl groups combining with each other at an arbitrary position; and the cyclic structure includes a structure having a vinylene bond which may be substituted, and a phenylene structure which may be substituted.

The electrically conducting polymer containing such a chemical structure is electrically charged and a dopant is doped thereto. For the dopant, known dopants can be used without limitation.

Specific examples of the inorganic semiconductor include an inorganic semiconductor mainly comprising lead dioxide or manganese dioxide, and an inorganic semiconductor comprising triiron tetraoxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electrical conductivity of $10^{-2}$ to $10^3$ S·cm$^{-1}$, the fabricated capacitor can have a smaller impedance value and can be more increased in the capacitance at a high frequency.

The electrically conducting polymer layer is produced, for example, by a method of polymerizing a polymerizable compound comprising aniline, thiophene, furan, pyrrole, methylpyrrole or a substitution derivative thereof under the action of an oxidizing agent capable of undergoing a satisfactory oxidation reaction of dehydrogenating double oxidation. Examples of the polymerization reaction from the polymerizable compound (monomer) include vapor phase polymerization and solution polymerization. The electrically conducting polymer layer is formed on the surface of the niobium sintered body having thereon a dielectric material. In the case where the electrically conducting polymer is an organic solvent-soluble polymer capable of solution coating, a method of coating the polymer on the surface of the sintered body to form an electrically conducting polymer layer is used.

One preferred example of the production method using the solution polymerization is a method of dipping the niobium sintered body having formed thereon a dielectric layer in a solution containing an oxidizing agent (Solution 1) and subsequently dipping the sintered body in a solution containing a monomer and a dopant (Solution 2) to form an electrically conducting polymer on the surface of the sintered body. Also, the sintered body may be dipped in Solution 1 after it is dipped in Solution 2. Solution 2 used in the above-described method may be a monomer solution not containing a dopant. In the case of using a dopant, a solution containing an oxidizing agent may be allowed to be present together on use of the dopant.

Such an operation in the polymerization step is repeated once or more, preferably from 3 to 20 times, per the niobium sintered body having thereon a dielectric material, whereby a dense and stratified electrically conducting polymer layer can be easily formed.

In the production method of a capacitor according to the present invention, any oxidizing agent may be used insofar as it does not adversely affect the capacitor performance and the reductant of the oxidizing agent can work out to a dopant and elevate the electrically conductivity of the electrically conducting polymer. An industrially inexpensive compound facilitated in the handling at the production is preferred.

Specific examples of the oxidizing agent include Fe(III)-base compounds such as $FeCl_3$, $FeClO_4$ and Fe (organic acid anion) salt; anhydrous aluminum chloride/cuprous chloride; alkali metal persulfates, ammonium persulfates; peroxides; manganeses such as potassium permanganate; quinones such as 2,3-dichloro-5,6-dicyano-1,4-benzoquinone (DDQ), tetrachloro-1,4-benzoquinone and tetracyano-1,4-benzoquinone; halogens such as iodine and bromine; peracid; sulfonic acid such as sulfuric acid, fuming sulfuric acid, sulfur trioxide, chlorosulfonic acid, fluorosulfonic acid and amidosulfuric acid; ozone, etc. and a mixture of a plurality of these oxidations.

Examples of the fundamental compound of the organic acid anion for forming the above-described Fe (organic acid anion) salt include organic sulfonic acid, organic carboxylic acid, organic phosphoric acid and organic boric acid, etc. Specific examples of the organic sulfonic acid include benzenesulfonic acid, p-toluenesulfonic acid, methanesulfonic acid, ethanesulfonic acid, (α-sulfonaphthalene, β-sulfonaphthalene, naphthalenedisulfonic acid, alkylnaphthalenesulfonic acid (examples of the alkyl group include butyl, triisopropyl and di-tert-butyl), etc.

Specific examples of the organic carboxylic acid include acetic acid, propionic acid, benzoic acid and oxalic acid. Furthermore, polymer electrolyte anions such as polyacrylic acid, polymethacrylic acid, polystyrenesulfonic acid, polyvinylsulfonic acid, poly-α-methylsulfonic acid polyvinylsulfate, polyethylenesulfonic acid and polyphosphoric acid may also be used in the present invention. These organic sulfuric acids and organic carboxylic acids are mere examples and the present invention is not limited thereto. Examples of the counter cation to the above-described anion include alkali metal ions such as $H^+$, $Na^+$ and $K^+$, and ammonium ions substituted by a hydrogen atom, a tetramethyl group, a tetraethyl group, a tetrabutyl group or a tetraphenyl group, however, the present invention is not limited thereto. Among these oxidizing agents, more preferred are trivalent Fe-base compounds and oxidizing agents comprising cuprous chloride, an alkali persulfate, an ammonium persulfate, an acid or a quinone.

For the anion having a dopant ability which is allowed to be present together, if desired, in the production of a polymer composition for the electrically conducting polymer (anion other than the reductant anion of the oxidizing agent), an electrolyte anion having as a counter anion an oxidizing agent anion (a reductant of oxidizing agent) produced from the above-described oxidizing agent, or other electrolyte anion may be used. Specific examples thereof include protonic acid anions including halide anion of Group 5B elements, such as $PF_6^-$, $SbF_6^-$ and $AsF_6^-$; halide anion of Group 3B elements, such as $BF_4^-$; halogen anion such as $I^-$ ($I_3^-$), $Br^-$ and $Cl^-$; perhalogenate anion such as $ClO_4^-$; Lewis acid anion such as $AlCl_4^-$, $FeCl_4^-$ and $SnCl_5^-$; inorganic acid anion such as $NO_3^-$ and $SO_4^{2-}$; sulfonate anion such as p-toluenesulfonic acid, naphthalenesulfonic acid, and alkyl-substituted naphthalenesulfonic acid having from 1 to 5 carbon atoms (hereinafter simply referred to as "C1–5"); organic sulfonate anion such as $CF_3SO_3^-$ and $CH_3SO_3^-$; and carboxylate anion such as $CH_3COO^-$ and $C_6H_5COO^-$.

Similarly to the above, polymer electrolyte anions such as polyacrylic acid, polymethacrylic acid, polystyrenesulfonic acid, polyvinylsulfonic acid, polyvinylsulfonic acid, poly-α-methylsulfonic acid, polyethylenesulfonic acid and polyphosphoric acid may also be used, however, the present invention is not limited thereto. The anion is preferably a polymer-type or oligomer-type organic sulfonic acid compound anion or a polyphosphoric acid compound anion. For the anion-donating compound, an aromatic sulfonic acid compound (e.g., sodium dodecylbenzenesulfonate, sodium naphthalenesulfonate) is preferably used.

Among the organic sulfonate anions, the more effective dopant are a sulfoquinone compound having one or more sulfo-anion group ($-SO_3^-$) within the molecule and a quinone structure, and an anthracene sulfonate anion.

Examples of the fundamental skeleton for the sulfoquinone anion of the above-described sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenequinone, 5,6-chrysenequinone, 6,12-chrysenequinone, acenaphthoquinone, acenaphthenequinone, camphorquinone, 2,3-bornanedione, 9,10-phenanthrenequinone and 2,7-pyrenequinone.

In the case where the other electrode (counter electrode) is solid, an electrical conducting layer may be provided thereon so as to attain good electrical contact with an exterior leading line (for example, lead frame), if desired.

The electrical conducting layer can be formed, for example, by the solidification of an electrically conducting paste, plating, metallization or formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in air or under heating. Examples of the plating include nickel plating, copper plating, silver plating and aluminum plating. Examples of the vapor-deposited metal include aluminum, nickel, copper and silver.

More specifically, for example, carbon paste and silver paste are stacked in this order on the second electrode and these are molded with a material such as epoxy resin, thereby constructing a capacitor. This capacitor may have a niobium or tantalum lead which is sintered and molded integrally with the lanthanum-containing niobium sintered body or welded afterward.

The thus-constructed capacitor of the present invention is jacketed using, for example, resin mold, resin case, metallic jacket case, dipping of resin or laminate film, and then used as a capacitor product for various uses.

In the case where the other electrode (counter electrode) is liquid, the capacitor constructed by the above-described two electrodes and a dielectric material is housed, for example, in a can electrically connected to the another part electrode to form a capacitor. In this case, the electrode side of the lanthanum-containing niobium sintered body is guided outside through a niobium or tantalum lead described above and at the same time, insulated from the can using an insulating rubber or the like.

By manufacturing a sintered body for capacitors using the niobium powder produced according to the embodiment of the present invention described in the foregoing pages and fabricating a capacitor from the sintered body, a capacitor having a good heat resistance, a small leakage current and good reliability can be obtained.

The capacitor of the present invention has a large electrostatic capacitance for the volume as compared with conventional tantalum capacitors and more compact capacitor products can be obtained.

The capacitor having these properties of the present invention can be applied to uses as a bypass or coupling capacitor in an analog or digital circuit and as a large-capacitance smoothing capacitor used in the light source circuit and also to uses of conventional tantalum capacitor.

In general, such a capacitor is used in an electronic circuit on great occasions and therefore, when the capacitor of the present invention is used, the restriction in displacement of electronic parts or discharge of heat is relieved and a highly reliable electronic circuit can be housed in a narrower space than in conventional techniques.

Furthermore, when the capacitor of the present invention is used, a highly reliable electronic instrument more compact than conventional ones, such as computer, computer peripheral equipment such as PC card, mobile equipment such as portable telephone, home appliances, equipment mounted on a car, artificial satellite and communication equipment, can be obtained.

BEST MODE FOR CARRYING OUT THE INVENTION

The present invention will now be explained more specifically with reference to the examples, but is not particularly limited to the following examples.

The capacitance and the leakage current value of the sintered body of a niobium powder containing at least one element selected from the group consisting of chromium, molybdenum, tungsten boron, aluminum, gallium, indium thallium, cerium, neodymium, titanium, rhenium, ruthenium, rhodium, palladium, silver, zinc, silicon, germanium, tin, phosphorus, arsenic, bismuth, rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium (hereinafter referred to as "niobium sintered body" or simply "sintered body") were measured by the following methods.

Measurement of the Capacitance of the Sintered Body

The niobium sintered body immersed in a 30% sulfuric acid and a tantalum electrode in the sulfuric acid were connected by a measuring apparatus made by Hewlett Packard Co., Ltd., under the trademark of "Precision LCR meter HP4284A" to measure the capacitance at room temperature. The capacitance (unit: $\mu F \cdot V/g$) at 120 Hz was regarded as the capacitance of the sintered body.

Measurement of the Leakage Current of the Sintered Body

A voltage that was 70% of the forming voltage (direct current) applied to form the dielectric was continuously applied for 3 minutes between the sintered body immersed in a 20% aqueous solution of phosphoric acid and an electrode in the aqueous solution of phosphoric acid at room temperature. The current value measured was regarded as the leakage current value (i.e., LC value with a unit of $\mu A/g$) of the sintered body. In the present invention, a voltage of 14 V was applied.

The capacitance and the leakage current value of the chip capacitor processed in the Examples were measured as follows.

Measurement of the Capacitance of the Capacitor

The LCR measuring apparatus made by Hewlett Packard Co., Ltd. was connected between the two terminals of the produced chip capacitor to measure the capacitance at room temperature. The capacitance at 120 Hz was regarded as the capacitance of the chip capacitor.

Measurement of the Leakage Current of the Capacitor

A direct current voltage was selected from the rated voltages of 2.5 V, 4 V, 6.3 V, 10 V, 16 V, and 25 V so that the selected voltage might be the closest to about $\frac{1}{3}$ to about $\frac{1}{4}$ of the forming voltage applied to prepare a dielectric, and continuously applied between the two terminals of the chip capacitor for one minute at room temperature. The current value measured one minute later was regarded as the leakage current value of the chip capacitor. In the present invention, a voltage of 6.3 V was applied.

EXAMPLE 1

92 g of a niobium ingot and 1.8 g of a tungsten powder were subjected to arc fusion, whereby a tungsten-containing niobium ingot (alloy) containing 1 mol % of tungsten was prepared. 50 g of the ingot was put into a reaction vessel made of stainless steel (SUS304), and hydrogen was continuously introduced into the vessel at 400° C. for 10 hours. The hydrogenated tungsten-containing niobium in the form of a cake was cooled and pulverized with balls made of stainless steel (SUS) for 10 hours in a pot made of stainless steel (SUS304).

The hydrogenated product prepared as a slurry in water in an amount of 20% by volume was placed in a wet pulverizer made of stainless steel (SUS304) (trademark "Atritor", made by Atlanta Corporation) together with zirconia balls and wet grinding was performed for 7 hours. The slurry was subjected to centrifugal sedimentation, and the pulverized particles were obtained by decantation. The pulverized particles were dried at 50° C. under a vacuum of 133 Pa.

Subsequently, the hydrogenated tungsten-containing niobium powder was heated at 400° C. for dehydrogenation under the application of a pressure of $1.33 \times 10^{-2}$ Pa for one hour. The mean particle size of the obtained tungsten-containing niobium powder was 1.0 μm, and the content of tungsten was found to be 1 mol % when measured by atomic absorption analysis. The tungsten-containing niobium powder thus obtained was granulated at 1150° C. under a vacuum of $3.99 \times 10^{-3}$ Pa, and thereafter, subjected to disintegration. Thus, a granulated powder with a mean particle size of 150 μm was obtained.

The tungsten-containing niobium powder thus granulated was integrally molded with a niobium lead wire with a diameter of 0.3 mm, whereby a molded article with a size of around 0.3 cm×0.18 cm×0.45 cm, weighing about 0.1 g, was produced.

The molded article was allowed to stand at 1200° C. under a vacuum of $3.99 \times 10^{-3}$ Pa for 30 minutes, thereby obtaining a sintered body. The obtained sintered body was subjected to forming in a 0.1% aqueous solution of phosphoric acid at 80° C. under the application of a voltage of 20 V for 200 minutes, so that a dielectric layer was deposited on the surface of the sintered body. Then, the capacitance of the sintered body in 30% sulfuric acid, and the leakage current of the sintered body (hereinafter referred to as "LC") in a 20% aqueous solution of phosphoric acid were separately measured. The results are shown in TABLE 5.

EXAMPLES 2 TO 9

In order to produce a niobium sintered body containing at least one of the above-mentioned transition elements of group VI in the periodic table, that is, at least one element selected from the group consisting of chromium, molybdenum, and tungsten, the transition element(s) of group VI of the periodic table in the form of a powder and a niobium ingot were mixed in an arbitrary ratio. Thus, a niobium ingot containing the transition element of the group VI of the periodic table was prepared by arc fusion. The niobium ingot, which weighed 50 g, was pulverized using the same apparatus as employed in Example 2 with the pulverizing time being changed. Using the prepared niobium powder containing the transition element of group VI of the periodic table, a sintered body was produced. The capacitance and the LC of the sintered body were separately measured. TABLE 5 shows the results.

Comparative Examples 1 to 4

A niobium powder containing no transition element of group VI of the periodic table was prepared in the same manner as in Example 1 in order to compare the results of Examples 1 to 9. Using the niobium powder, a sintered body was produced by following the same procedures as in Example 1, and the capacitance and the LC of the sintered body were measured. TABLE 5 shows the results.

TABLE 5

| | Composition (molar ratio) | | | | Mean Particle Size | Capacitance | LC |
|---|---|---|---|---|---|---|---|
| | Nb | Cr | Mo | W | (μm) | (μF · V/g) | (μA/g) |
| Ex. 1 | 99 | — | — | 1 | 1.0 | 120000 | 36 |
| Ex. 2 | 99 | — | 1 | — | 1.0 | 118000 | 42 |
| Ex. 3 | 99 | 1 | — | — | 1.0 | 115000 | 52 |
| Ex. 4 | 99 | — | 0.5 | 0.5 | 1.0 | 121000 | 42 |
| Ex. 5 | 99 | 0.2 | — | 0.8 | 1.0 | 119000 | 40 |
| Ex. 6 | 99 | — | — | 1 | 0.5 | 240000 | 132 |
| Ex. 7 | 99 | — | — | 1 | 0.7 | 169000 | 97 |
| Ex. 8 | 99 | — | — | 1 | 1.3 | 99000 | 27 |
| Ex. 9 | 99 | — | — | 1 | 3.2 | 31000 | 3 |
| Comp. Ex. 1 | 100 | — | — | — | 0.5 | 210000 | 2210 |
| Comp. Ex. 2 | 100 | — | — | — | 0.7 | 139000 | 1570 |
| Comp. Ex. 3 | 100 | — | — | — | 1.0 | 101000 | 592 |
| Comp. Ex. 4 | 100 | — | — | — | 1.3 | 85000 | 389 |

EXAMPLES 10 TO 15

The amounts of niobium and tungsten were varied before arc fusion in order to change the content of tungsten in the obtained tungsten-containing niobium. Thus, a niobium ingot containing tungsten in an amount of 0.01 to 10 mol % was prepared. A sintered body was prepared from 50 g of the tungsten-containing niobium ingot having each concentration of tungsten in the same manner as in Example 1. The capacitance and the LC were separately measured. TABLE 8 shows the results.

Comparative Example 5 and Example 16

A niobium ingot containing 0 mol % of tungsten, and a niobium ingot containing 15.5 mol % of tungsten were prepared to compare the results of Examples 10 to 15. A sintered body was prepared from 50 g of the tungsten-containing niobium ingot having each concentration of tungsten in the same manner as in Example 1. The capacitance and the LC were separately measured. TABLE 6 shows the results.

TABLE 6

|  | Content of Tungsten (mol %) | Mean Particle Size (μm) | Capacitance (μF · V/g) | LC (μA/g) |
|---|---|---|---|---|
| Example 10 | 0.02 | 1.0 | 111000 | 79 |
| Example 11 | 0.05 | 1.0 | 113000 | 71 |
| Example 12 | 0.5 | 1.0 | 121000 | 39 |
| Example 13 | 3.1 | 1.0 | 119000 | 39 |
| Example 14 | 6.2 | 1.0 | 117000 | 63 |
| Example 15 | 10.0 | 1.0 | 109000 | 76 |
| Comparative Example 5 | 0.0 | 1.0 | 101000 | 592 |
| Example 16 | 15.5 | 1.0 | 67000 | 89 |

EXAMPLES 17 TO 22

100 g of a niobium ingot was put into a reaction vessel made of stainless steel (SUS304), and hydrogen was continuously introduced into the vessel at 400° C. for 10 hours. The hydrogenated niobium in the form of a cake was cooled and pulverized with balls made of stainless steel (SUS) for 10 hours in a pot made of stainless steel (SUS304). The hydrogenated product was prepared as a slurry in water in an amount of 20% by volume and placed in a wet pulverizer made of stainless steel (SUS304) (trademark "Atritor") together with zirconia balls, and wet grinding was performed for 7 hours. The slurry was subjected to centrifugal sedimentation, and the pulverized particles were obtained by decantation. The pulverized particles were dried at 50° C. under a vacuum of 133 Pa. Subsequently, the hydrogenated niobium powder was heated at 400° C. for dehydrogenation under the application of a pressure of $1.33 \times 10^{-2}$ Pa for one hour. The mean particle size of the obtained niobium powder was 1.3 μm.

Any one of tungsten carbide, tungsten oxide, or tungsten metal, each having a mean particle size of about 1 μm, was added to the niobium powder in an arbitrary mixing ratio. The tungsten-containing niobium powder thus obtained was granulated at 1150° C. under a vacuum of $3.99 \times 10^{-3}$ Pa, and thereafter, subjected to disintegration. Thus, a granulated powder with a mean particle size of 190 μm was obtained. The tungsten-containing niobium granulated powder was integrally molded with a niobium lead wire with a diameter of 0.3 mm, whereby a molded article with a size of around 0.3 cm×0.18 cm×0.45 cm, weighing about 0.1 g, was produced.

The molded article was allowed to stand at 1230° C. under a vacuum of $3.99 \times 10^{-3}$ Pa for 30 minutes, thereby obtaining a sintered body. The obtained sintered body was subjected to forming in a 0.1% aqueous solution of phosphoric acid at 80° C. under the application of a voltage of 20 V for 200 minutes, so that a dielectric layer was deposited on the surface of the sintered body. Then, the capacitance of the sintered body in 30% sulfuric acid, and the LC of the sintered body in a 20% aqueous solution of phosphoric acid were separately measured. The results are shown in TABLE 7.

TABLE 7

|  | Spieces of Tungsten | Content of Tungsten (mol %) | Capacitance (μF · V/g) | LC (μA/g) |
|---|---|---|---|---|
| Example 17 | WC | 0.2 | 100000 | 35 |
| Example 18 | WC | 1.0 | 98000 | 26 |
| Example 19 | WO$_2$ | 0.5 | 99000 | 27 |
| Example 20 | WO$_2$ | 2.2 | 97000 | 28 |
| Example 21 | W | 0.05 | 101000 | 40 |
| Example 22 | W | 0.7 | 99000 | 29 |

EXAMPLES 23 TO 27

To obtain a tungsten-containing niobium nitride, 10 g of the tungsten-containing niobium powder with a mean particle size of 0.9 μm, containing tungsten in an amount of 1.2 mol %, prepared by the same method as in Example 15, was put into a reaction vessel made of stainless steel (SUS304). With nitrogen introduced into the vessel at 300° C. for 0.5 to 20 hours, a tungsten-containing niobium nitride was obtained. The amount of nitrogen in the niobium nitride was determined using an apparatus made by LECO Corporation for determining nitrogen content based on thermal conductivity. The ratio of the amount of nitrogen to the weight of the powder separately measured was defined as the nitride content. As a result, the nitride content was 0.02 to 0.89% by mass.

The tungsten-containing niobium nitride thus obtained was subjected to the same steps of granulation, molding, and sintering as in Example 1, so that a sintered body was prepared. The obtained sintered body was subjected to forming in a 0.1% aqueous solution of phosphoric acid at 80° C. under the application of a voltage of 20 V for 200 minutes, so that a dielectric layer was deposited on the surface of the sintered body. Then, the capacitance of the sintered body in 30% sulfuric acid, and the LC of the sintered body in a 20% aqueous solution of phosphoric acid were separately measured. The results are shown in TABLE 8.

TABLE 8

|  | Content of Tungsten (mol %) | Amount of Nitrogen (% by mass) | Capacitance (μF · V/g) | LC (μA/g) |
|---|---|---|---|---|
| Example 23 | 1.2 | 0.02 | 140000 | 65 |
| Example 24 | 1.2 | 0.10 | 136000 | 58 |
| Example 25 | 1.2 | 0.28 | 138000 | 55 |
| Example 26 | 1.2 | 0.43 | 141000 | 63 |
| Example 27 | 1.2 | 0.89 | 139000 | 71 |

EXAMPLES 28 TO 30

In order to obtain a sintered body comprising a mixture of a tungsten-containing niobium powder and a niobium powder, a tungsten-containing niobium powder with a mean particle size of 1.0 μm containing tungsten in an amount of 10 mol % was prepared by the same method as in Example 1. Apart from this, sodium was added to 20 g of potassium fluoroniobate fully dried at 80° C. under vacuum in a nickel crucible so that the amount of sodium was 10 times the molar amount of potassium fluoroniobate. Then, reduction was carried out at 1000° C. in an atmosphere of argon for 20 hours. After completion of the reduction reaction, the reduced product was cooled, and successively washed with water, 95% sulfuric acid, and water, and thereafter dried under vacuum.

The resulting product was pulverized for 40 hours using a ball mill, that is, an alumina pot provided with silica-alumina balls. Then, the pulverized product was immersed in a liquid mixture of 50% nitric acid and a 10% aqueous solution of hydrogen peroxide in a ratio by mass of 3:2, with stirring. The pulverized product was thoroughly washed with water to remove impurities until the pH of the product reached 7, and dried under vacuum. The mean particle size of the obtained niobium powder was 1.2 $\mu$m.

The tungsten-containing niobium powder and the niobium powder separately prepared by the above-mentioned methods were sufficiently mixed in an arbitrary ratio, and the mixture was subjected to the same steps of granulation, molding, and sintering as in Example 15, thereby obtaining a sintered body. The capacitance and the LC of the sintered body were separately measured. TABLE 9 shows the results.

EXAMPLES 31 TO 33

In order to obtain a sintered body of a tungsten-containing niobium nitride comprising a mixture of a tungsten-containing niobium powder and a niobium powder, a tungsten-containing niobium powder with a mean particle size of 1.0 $\mu$m containing tungsten in an amount of 10 mol % was prepared by the same method as in Example 15. Apart from this, 50 g of a niobium ingot was put into a reaction vessel made of stainless steel (SUS304), and hydrogen was continuously introduced into the vessel at 400° C. for 12 hours. The hydrogenated niobium in the form of a cake was cooled and pulverized with iron balls for 10 hours in a pot made of stainless steel (SUS304).

The pulverized product was put into the same reaction vessel made of stainless steel (SUS304) as mentioned above, and again hydrogenated under the same conditions as mentioned above. The hydrogenated product was prepared as a slurry in water in an amount of 20% by volume and placed in a wet pulverizer made of stainless steel (SUS304) (trademark "Atritor") together with zirconia balls and wet grinding was performed for 6 hours.

The slurry was subjected to centrifugal sedimentation, and the pulverized particles were obtained by decantation. The pulverized particles were dried at 50° C. under a vacuum of 133 Pa. Subsequently, the hydrogenated niobium powder was heated at 400° C. for dehydrogenation under a pressure of 1.33×10$^{-2}$ Pa for one hour. The mean particle size of the obtained niobium powder was 1.3 $\mu$m.

The tungsten-containing niobium powder and niobium powder thus obtained were sufficiently mixed in an arbitrary ratio, and a nitride was obtained in the same manner as in Example 25. The tungsten-containing niobium nitride was subjected to the steps of granulation, molding, and sintering, so that a sintered body was prepared. Then, the capacitance and the LC of the sintered body were separately measured. The results are shown in TABLE 9.

TABLE 9

| | Type of Niobium Powder | Mixing Ratio (tungsten-containing niobium powder:niobium powder) | Capacitance ($\mu$F · V/g) | LC ($\mu$A/g) |
|---|---|---|---|---|
| Example 28 | Reduced powder | 90:10 | 110000 | 73 |
| Example 29 | Reduced powder | 50:50 | 117000 | 55 |
| Example 30 | Reduced powder | 10:90 | 119000 | 38 |
| Example 31 | Pulverized powder | 80:20 | 111000 | 68 |
| Example 32 | Pulverized powder | 40:60 | 118000 | 52 |
| Example 33 | Pulverized powder | 20:80 | 121000 | 41 |

EXAMPLES 34 AND 35

In Example 34 and Example 35, 50 units of sintered bodies red in the same manner as in Example 1 and Example 11 respectively. A voltage of 20 V was applied to each sintered body for 200 minutes in a 0.1% aqueous solution of phosphoric acid, whereby a dielectric oxide film was deposited on the surface of the sintered body by electrolytic forming. Then, the steps of immersing the dielectric-film-bearing sintered body in a 60% aqueous solution of manganese nitrate and heating at 220° C. for 30 minutes were repeated, so that a manganese dioxide layer serving as the counter electrode layer was formed on the dielectric oxide film, Subsequently, a carbon layer and a silver paste layer were successively overlaid on the counter electrode layer. After, mounting of a lead frame, the whole body was sealed with an epoxy resin to produce a chip capacitor. TABLE 10 shows the average capacitance and the average LC value of the chip capacitors (n=50 units for each). The LC value was a value obtained at room temperature under a voltage of 6.3 V for one minute.

EXAMPLES 36 AND 37

In Example 36 and Example 37, 50 units of sintered bodies were prepared in the same manner as in Example 8 and Example 15 respectively. A voltage of 20 V was applied to each sintered body for 200 minutes in a 0.1% aqueous solution of phosphoric acid, whereby a dielectric oxide film was deposited on the surface of the sintered body by electrolytic forming. Then, the steps of immersing the dielectric-film-bearing sintered body in a liquid mixture of a 35% aqueous solution of lead acetate and a 35% aqueous solution of ammonium persulfate in a mixing ratio by volume of 1:1 and inducing a reaction at 40° C. for one hour were repeated, so that a mixture layer of lead dioxide and lead sulfate serving as the counter electrode layer was formed on the dielectric oxide film. Subsequently, a carbon layer and a silver paste layer were successively overlaid on the counter electrode layer.

After mounting of a lead frame, the whole body was sealed with an epoxy resin to produce a chip capacitor. TABLE 10 shows the average capacitance and the average LC value of the chip capacitors (n=50 units for each). The LC value was a value obtained at room temperature under a voltage of 6.3 V for one minute.

EXAMPLES 38 TO 40

In Example 38, Example 39, and Example 40, 50 units of sintered bodies were prepared in the same manner as in Example 7, Example 12, and Example 25, respectively. A voltage of 20 V was applied to each sintered body for 200 minutes in a 0.1% aqueous solution of phosphoric acid, whereby a dielectric oxide film was deposited on the surface of the sintered body by electrolytic forming. Then, the steps of bringing the dielectric-film-bearing sintered body into contact with a liquid mixture of a 10% aqueous solution of ammonium persulfate and a 0.5% aqueous solution of anthraquinonesulfonic acid in a mixing ratio by volume of 1:1 and exposing the dielectric oxide film to a pyrrole gas were repeated at least 5 times, so that the other electrode (counter electrode) of polypyrrole was formed on the dielectric oxide film.

Subsequently, a carbon layer and a silver paste layer were successively overlaid on the counter electrode. After mounting of a lead frame, the whole body was sealed with an epoxy resin to produce a chip capacitor. TABLE 10 shows the average capacitance and the average LC value of the chip capacitors (n=50 units for each). The LC value was a value obtained at room temperature under a voltage of 6.3 V for one minute.

Comparative Examples 6 to 8

In a nickel crucible, sodium was added to 20 g of potassium fluoroniobate fully dried at 80° C. under vacuum so that the amount of sodium was 10 times the molar amount of potassium fluoroniobate. Then, reduction was carried out at 1000° C. in an atmosphere of argon for 20 hours. After completion of the reduction reaction, the reduced product was cooled, and successively washed with water, 95% sulfuric acid, and water, and thereafter dried under vacuum. The resulting product was pulverized for 40 hours using a ball mill, that is, an alumina pot provided with silica-alumina balls. Then, the pulverized product was immersed in a liquid mixture of 50% nitric acid and a 10% aqueous solution of hydrogen peroxide in a ratio by mass of 3:2, with stirring. The pulverized product was thoroughly washed with water to remove impurities until the pH of the product reached 7, and dried under vacuum. The mean particle size of the obtained niobium powder was 1.3 $\mu$m. 30 g of the niobium powder thus prepared was put into a reaction vessel made of stainless steel (SUS304), with nitrogen introduced therein at 300° C. for 0.5 to 4 hours. Thus, a niobium nitride was obtained.

The amount of nitrogen in the niobium nitride was determined using an apparatus made by LECO Corporation for determining nitrogen content based on thermal conductivity. The ratio of the amount of nitrogen to the weight of the powder separately measured was defined as the nitride content. As a result, the nitride content was 0.02 to 0.30% by mass. The niobium nitride thus obtained was subjected to the same steps of granulation, molding, and sintering as in Example 1, so that a sintered body was prepared. With respect to 50 units of the sintered bodies thus obtained, a voltage of 20 V was applied to each sintered body for 200 minutes in a 0.1% aqueous solution of phosphoric acid, whereby a dielectric oxide film was deposited on the surface of the sintered body by electrolytic forming. Then, the steps of immersing the dielectric-film-bearing sintered body in a 60% aqueous solution of manganese nitrate and heating the sintered body at 220° C. for 30 minutes were repeated, so that a manganese dioxide layer serving as the counter electrode layer was formed on the dielectric oxide film. Subsequently, a carbon layer and a silver paste layer were successively overlaid on the counter electrode. After mounting of a lead frame, the whole body was sealed with an epoxy resin to produce a chip capacitor. TABLE 10 shows the average capacitance and the average LC value of the chip capacitors (n=50 units for each). The LC value was a value obtained at room temperature under a voltage of 6.3 V for one minute.

Comparative Examples 9 to 11

50 g of a niobium ingot was put into a reaction vessel made of stainless steel (SUS304), and hydrogen was continuously introduced into the vessel at 400° C. for 12 hours. The hydrogenated niobium in the form of a cake was cooled and pulverized with iron balls for 10 hours in a pot made of stainless steel (SUS304). The pulverized product was put into the same reaction vessel made of stainless steel (SUS304) as mentioned above, and again hydrogenated under the same conditions as mentioned above. The hydrogenated product was prepared as a slurry in water in an amount of 20% by volume and placed in a wet pulverizer made of stainless steel (SUS304) (trademark "Atritor") together with zirconia balls and wet grinding was performed for 6 hours. The slurry was subjected to centrifugal sedimentation, and the pulverized particles were obtained by decantation. The pulverized particles were dried at 50° C. under a vacuum of 133 Pa.

Subsequently, the hydrogenated niobium powder was heated at 400° C. for dehydrogenation under a pressure $1.33 \times 10^{-2}$ Pa for one hour. The mean particle size of the obtained niobium powder was 1.0 $\mu$m. 30 g of the niobium powder was put into a reaction vessel made of stainless steel (SUS304), with nitrogen being introduced therein at 300° C. for 0.5 to 3 hours, thereby obtaining a niobium nitride. The amount of nitrogen in the niobium nitride was determined using an apparatus made by LECO Corporation for determining nitrogen content based on thermal conductivity. The ratio of the amount of nitrogen to the weight of the powder separately measured was defined as the nitride content. As a result, the nitride content was 0.03 to 0.28% by mass. The niobium nitride thus obtained was subjected to the same steps of granulation, molding, and sintering as in Example 1, so that a sintered body was prepared. With respect to 50 units of sintered bodies, a voltage of 20 V was applied to each sintered body for 200 minutes in a 0.1% aqueous solution of phosphoric acid, whereby a dielectric oxide film was deposited on the surface of the sintered body by electrolytic forming. Then, the steps of bringing the dielectric-film-bearing sintered body into contact with a liquid mixture of a 10% aqueous solution of ammonium persulfate and a 0.5% aqueous solution of anthraquinonesulfonic acid in a mixing ratio by volume of 1:1 and exposing the dielectric oxide film to a pyrrole gas were repeated at least 5 times, so that the counter electrode of polypyrrole was formed on the dielectric oxide film. Subsequently, a carbon layer and a silver paste layer were successively overlaid on the counter electrode.

After mounting of a lead frame, the whole body was sealed with an epoxy resin to produce a chip capacitor. TABLE 10 shows the average capacitance and the average LC value of the chip capacitors (n=50 units for each). The LC value was a value obtained at room temperature under a voltage of 6.3 V for one minute.

EXAMPLE 41

In Example 41, 50 units of sintered bodies were prepared in the same manner as in Example 25. A voltage of 20 V was applied to each sintered body for 200 minutes in a 0.1% aqueous solution of phosphoric acid, whereby a dielectric oxide film was deposited on the surface of the sintered body by electrolytic forming. Then, the niobium sintered body was immersed in an aqueous solution containing ammonium persulfate in an amount of 25% by mass (solution 1A), removed from the solution 1A, and dried at 80° C. for 30 minutes, thereby forming a dielectric. Thereafter, the dielectric-deposited sintered body was immersed in an isopropanol solution containing 3,4-ethylenedioxythiophene in an amount of 18% by mass (solution 2), removed from the solution 2, and allowed to stand at 60° C. for 10 minutes, thereby carrying out oxidative polymerization.

The resultant product was immersed in the solution 1A again, and under went the same steps as mentioned above. After the procedure from immersion in the solution 1A to oxidative polymerization was repeated 8 times, the resultant product was washed with hot water of 50° C. for 10 minutes, and then dried at 100° C. for 30 minutes, thereby forming the other electrode (counter electrode) comprising electroconducting poly(3,4-ethylenedioxythiophene).

Subsequently, a carbon layer and a silver paste layer were successively overlaid on the counter electrode. After mounting of a lead frame, the whole body was sealed with an epoxy resin to produce a chip capacitor. TABLE 10 shows the average capacitance and the average LC value of the chip capacitors (n=50 units). The LC value was a value obtained at room temperature under a voltage of 6.3 V for one minute.

EXAMPLE 42

50 units of sintered bodies were prepared in the same manner as in Example 12. A voltage of 20 V was applied to each sintered body for 200 minutes in a 0.1% aqueous solution of phosphoric acid, whereby a dielectric oxide film was deposited on the surface of the sintered body by electrolytic forming. Then, the niobium sintered body was immersed in an aqueous solution containing ammonium persulfate in an amount of 25% by mass and sodium anthraquinone-2-sulfonate in an amount of 3% by mass (solution 1B), removed from the solution 1B, and dried at 80° C. for 30 minutes, thereby forming a dielectric. Thereafter, the dielectric-deposited sintered body was immersed in an isopropanol solution containing 3,4-ethylenedioxythiophene in an amount of 18% by mass (solution 2), removed from the solution 2, and allowed to stand at 60° C. for 10 minutes, thereby carrying out oxidative polymerization.

The resultant product was immersed in the solution 1B again, and underwent the same steps as mentioned above. After the procedure from immersion in the solution 1B to oxidative polymerization was repeated 8 times, the resultant product was washed with hot water of 50° C. for 10 minutes, and then dried at 100° C. for 30 minutes, thereby forming the other electrode (counter electrode) comprising electroconducting poly(3,4-ethylenedioxythiophene).

Subsequently, a carbon layer and a silver paste layer were successively overlaid on the counter electrode. After mounting of a lead frame, the whole body was sealed with an epoxy resin to produce a chip capacitor. TABLE 10 shows the average capacitance and the average LC value of the chip capacitors (n=50 units). The LC value was a value obtained at room temperature under a voltage of 6.3 V for one minute.

TABLE 10

| | Content of Nitrogen (% by mass) | Capacitance ($\mu$F) | LC ($\mu$A) | Number of Samples with LC of more than 100 $\mu$A |
|---|---|---|---|---|
| Example 34 | — | 539 | 25 | 0/50 |
| Example 35 | — | 506 | 50 | 0/50 |
| Example 36 | — | 440 | 17 | 0/50 |
| Example 37 | — | 491 | 69 | 0/50 |
| Example 38 | — | 763 | 67 | 0/50 |
| Example 39 | — | 548 | 26 | 0/50 |
| Example 40 | 0.28 | 621 | 40 | 0/50 |
| Comparative Example 6 | 0.02 | 399 | 46 | 1/50 |
| Comparative Example 7 | 0.09 | 393 | 42 | 1/50 |
| Comparative Example 8 | 0.30 | 384 | 30 | 0/50 |
| Comparative Example 9 | 0.03 | 454 | 48 | 1/50 |
| Comparative Example 10 | 0.14 | 449 | 44 | 0/50 |
| Comparative Example 11 | 0.28 | 459 | 40 | 0/50 |
| Example 41 | 0.28 | 619 | 38 | 0/50 |
| Example 42 | — | 545 | 23 | 0/50 |

EXAMPLE 43

Using 93 g of a niobium ingot and 0.25 g of boron powder, a boron-containing niobium ingot (alloy) having a boron content of 2 mol % was produced by arc melting. In an SUS 304-made reactor, 50 g of the obtained ingot was placed and hydrogen was continuously introduced thereinto at 400° C. for 10 hours. After cooling, the hydrogenated boron-containing niobium cake placed in an SUS 304-made pot containing SUS-made balls and pulverized for 10 hours. Thereafter, this hydride was formed into a 20 vol % slurry with water, charged together with zirconia balls into an SUS 304-made spike mill, and wet-pulverized at 10° C. or less for 7 hours. The resulting slurry was subjected to centrifugal sedimentation and decanted to obtain a pulverized product. The pulverized product was dried in a vacuum under the conditions of $1.33 \times 10^2$ Pa and 50° C.

Subsequently, the hydrogenated boron-containing niobium powder was dehydrogenated under heating at $1.33 \times 10^{-2}$ Pa and 400° C. for 1 hour. The produced boron-containing niobium powder had a mean particle size of 1.0 $\mu$m and the boron content thereof was measured by the atomic absorption analysis and found to be 2 mol %. The thus-obtained boron-containing niobium powder was granulated in a vacuum of $3.99 \times 10^{-3}$ Pa at 1,000° C. Thereafter, the granulated cake was pulverized to obtain a granulated powder having a mean particle size of 100 $\mu$m.

The thus-obtained boron-containing niobium granulated powder was molded together with a 0.3-mm$\phi$ niobium lead wire to manufacture a molded article having a size of approximately 0.3×0.18×0.45 cm (weighing about 0.1 g).

This molded article was allowed to stand in a vacuum of $3.99 \times 10^{-3}$ Pa at 1,200° C. for 30 minutes and thereby, a sintered body was obtained. The sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the leakage current (LC) in an aqueous 20% phosphoric acid solution were measured. The results obtained are shown in Table 11.

EXAMPLES 44 TO 55

In the above-described manufacture of a niobium sintered body comprising boron and aluminum, a powder of boron, aluminum, gallium, indium or thallium and a niobium ingot were used at an arbitrary ratio to produce niobium ingots containing boron, aluminum, gallium, indium or thallium by arc melting. Thereafter, 50 g of each ingot was pulverized using the same apparatus as in Example 43 by changing the pulverization time. Using the thus-obtained niobium powder containing boron and aluminum, sintered bodies were manufactured and each was measured on the capacitance and the LC value. The results obtained are shown in Table 11.

Comparative Examples 12 to 15

For the purpose of comparison with Examples 43 to 55, four kinds of niobium powder not containing any of boron, aluminum, gallium, indium and thallium and having a different mean particle size were produced in the same manner as in Example 43. Using the produced niobium powder, sintered bodies were manufactured and measured on the capacitance and the LC. The results obtained are shown in Table 11.

TABLE 11

| | Composition (molar ratio) | | | | | Mean Particle Size | Capacitance | LC |
|---|---|---|---|---|---|---|---|---|
| | Nb | B | Al | Ga | In | Tl | ($\mu$m) | ($\mu$F·V/g) | ($\mu$A/g) |

| | Nb | B | Al | Ga | In | Tl | ($\mu$m) | ($\mu$F·V/g) | ($\mu$A/g) |
|---|---|---|---|---|---|---|---|---|---|
| Ex. | | | | | | | | | |
| 43 | 98 | 2.0 | — | — | — | — | 1.0 | 115000 | 28 |
| 44 | 99 | — | 1.0 | — | — | — | 1.0 | 114000 | 33 |
| 45 | 99 | — | — | 1.0 | — | — | 1.0 | 115000 | 37 |
| 46 | 99 | — | — | — | 1.0 | — | 1.0 | 116000 | 39 |
| 47 | 99 | — | — | — | — | 1.0 | 1.0 | 114000 | 39 |
| 48 | 98 | 1.0 | 1.0 | — | — | — | 1.0 | 115000 | 32 |
| 49 | 98 | 0.5 | 1.5 | — | — | — | 1.0 | 114000 | 33 |
| 50 | 98 | 1.5 | 0.5 | — | — | — | 1.0 | 116000 | 30 |
| 51 | 98 | 2.0 | — | — | — | — | 0.1 | 540000 | 344 |
| 52 | 98 | 2.0 | — | — | — | — | 0.5 | 240000 | 153 |
| 53 | 98 | 2.0 | — | — | — | — | 0.7 | 155000 | 75 |
| 54 | 98 | 2.0 | — | — | — | — | 1.3 | 95000 | 18 |
| 55 | 98 | 2.0 | — | — | — | — | 3.2 | 35000 | 2 |
| Comp. Ex. | | | | | | | | | |
| 12 | 100 | — | — | — | — | — | 0.5 | 182000 | 2120 |
| 13 | 100 | — | — | — | — | — | 0.7 | 120000 | 1074 |
| 14 | 100 | — | — | — | — | — | 1.0 | 87000 | 424 |
| 15 | 100 | — | — | — | — | — | 1.3 | 74000 | 233 |

EXAMPLES 56 TO 63

In order to change the boron content of the boron-containing niobium powder, boron-containing niobium ingots having a boron content of 0.02 to 9.8 mol % were produced by varying the amounts of niobium and boron processed by the arc melting. Thereafter, using 50 g of each of the boron-niobium containing niobium ingots having respective boron concentrations, sintered bodies were manufactured by the same operation as in Example 1 and each was measured on the capacitance and the LC. The results obtained are shown in Table 12.

Comparative Examples 16 to 18

For the purpose of comparison with Examples 52 to 59, boron-containing niobium ingots having a boron content of 0 mol %, 13.3 mol % or 17.5 mol % were manufactured. Thereafter, using 50 g of each of the boron-containing niobium ingots having respective boron concentrations, sintered bodies were manufactured by the same operation as in Example 43 and each was measured on the capacitance and the LC. The results obtained are shown in Table 12.

TABLE 12

| | Boron Content (mol %) | Mean Particle Size ($\mu$m) | Sintering Temp. (° C.) | Capacitance ($\mu$F·V/g) | LC ($\mu$A/g) |
|---|---|---|---|---|---|
| Example | | | | | |
| 56 | 0.02 | 1.0 | 1200 | 105000 | 52 |
| 57 | 0.10 | 1.0 | 1200 | 112000 | 43 |
| 58 | 1.1 | 1.0 | 1200 | 113000 | 36 |
| 43 | 2.0 | 1.0 | 1200 | 115000 | 28 |
| 59 | 3.0 | 1.0 | 1200 | 117000 | 28 |
| 60 | 4.1 | 1.0 | 1200 | 116000 | 29 |
| 61 | 5.2 | 1.0 | 1200 | 112000 | 32 |
| 62 | 7.5 | 1.0 | 1200 | 105000 | 38 |
| 63 | 9.8 | 1.0 | 1200 | 98000 | 43 |
| Comparative Example | | | | | |
| 16 | 0.0 | 1.0 | 1200 | 88000 | 420 |
| 17 | 13.3 | 1.0 | 1200 | 85000 | 49 |
| 18 | 17.5 | 1.0 | 1200 | 79000 | 52 |

EXAMPLES 64 TO 69

In an SUS 304-made reactor, 100 g of a niobium ingot was placed and hydrogen was continuously introduced thereinto at 400° C. for 10 hours. After cooling, the hydrogenated niobium cake was placed in an SUS 304-made pot containing SUS-made balls and pulverized for 10 hours. Thereafter, this hydride was formed into a 20 vol % slurry with water, charged together with zirconia balls into an SUS 304-made spike mill, and wet-pulverized for 7 hours. The resulting slurry was subjected to centrifugal sedimentation and decanted to obtain a pulverized product. The pulverized product was dried in a vacuum under the conditions of $1.33 \times 10^2$ Pa and 50° C. Subsequently, the hydrogenated niobium powder was dehydrogenated under heating at $1.33 \times 10^{-2}$ Pa and 400° C. for 1 hour. The manufactured niobium powder had a mean particle size of 1.1 $\mu$m. Into this niobium powder, any one of niobium diboronate, boron oxide and boron metal each having a mean particle size of about 1 $\mu$m was mixed at an arbitrary ratio. The obtained boron-containing niobium powder was granulated in a vacuum of $3.99 \times 10^{-3}$ Pa at 1,050° C. Thereafter, the granulated cake was pulverized to obtain a granulated powder having a mean particle size of 90 $\mu$m. The thus-obtained boron-containing niobium granulated powder was molded together with a 0.3-mm$\phi$ niobium lead wire to manufacture a molded article having a size of approximately 0.3×0.18×0.45 cm (weighing about 0.1 g). Subsequently, these molded articles were allowed to stand in a vacuum of $3.99 \times 10^{-3}$ Pa at 1,200° C. for 30 minutes to obtain sintered bodies. The resulting sintered bodies each was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC in an aqueous 20% phosphoric acid solution were measured. The results obtained are shown in Table 13.

TABLE 13

| | Species of Boron | Boron Content (mol %) | Capacitance ($\mu F \cdot V/g$) | LC ($\mu A/g$) |
|---|---|---|---|---|
| Example | | | | |
| 64 | $NbB_2$ | 2.9 | 117000 | 30 |
| 65 | $NbB_2$ | 1.2 | 112000 | 38 |
| 66 | $BO_3$ | 3.8 | 113000 | 34 |
| 67 | $BO_3$ | 2.2 | 112000 | 32 |
| 68 | B | 0.5 | 112000 | 38 |
| 69 | B | 1.1 | 114000 | 39 |

EXAMPLES 70 TO 74

In order to obtain a boron-containing niobium nitride, 10 g of boron-containing niobium powder containing 3.2 mol % of boron and having a mean particle size of 0.9 $\mu$m was manufactured in the same manner as in Example 43 and charged into an SUS 304-made reactor and thereinto, nitrogen was continuously introduced at 300° C. for 0.5 to 20 hours to obtain boron-containing niobium nitrides. The nitrogen amount of each nitride was determined using a nitrogen amount measuring apparatus manufactured by LECO which determines the nitrogen amount from the thermal conductivity. The ratio of the measured value to the separately measured weight of powder was designated as the nitrided amount. The nitrided amount here was from 0.02 to 0.89% by mass.

The thus-obtained boron-containing niobium nitrides each was granulated, molded and sintered in the same manner as in Example 43 and each sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC value in an aqueous 20% phosphoric acid solution were measured. The results obtained are shown in Table 14.

TABLE 14

| | Boron Content (mol %) | Nitrogen Content (mass %) | Capacitance ($\mu F \cdot V/g$) | LC ($\mu A/g$) |
|---|---|---|---|---|
| Ex. | | | | |
| 70 | 3.2 | 0.02 | 129000 | 31 |
| 71 | 3.2 | 0.10 | 128000 | 30 |
| 72 | 3.2 | 0.28 | 128000 | 28 |
| 73 | 3.2 | 0.43 | 127000 | 33 |
| 74 | 3.2 | 0.89 | 128000 | 39 |

EXAMPLES 75 AND 76

In order to obtain a sintered body comprising a mixture of boron-containing niobium powder and niobium powder, boron-containing niobium powder containing 6.9 mol % of boron and having a mean particle size of 1.0 $\mu$m was obtained in the same manner as in Example 43.

Separately, into a nickel-made crucible, 20 g of potassium fluoroniobate thoroughly dried in a vacuum at 80° C. and sodium in a molar amount of 10 times the potassium fluoroniobate were charged and allowed to perform a reduction reaction at 1,000° C. for 20 hours in an argon atmosphere. After the completion of reaction, the reduction product was cooled, washed with water, washed with 95% sulfuric acid and then with water in sequence, dried in a vacuum and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried in a vacuum. The produced niobium powder had a mean particle size of 1.2 $\mu$m.

The thus-obtained boron-containing niobium powder was thoroughly mixed with niobium powder at a ratio shown in Table 15 and the resulting mixtures each was granulated, molded and sintered in the same manner as in Example 1 to obtain sintered bodies. The capacitance and the LC value of each sintered body were measured and the results obtained are shown in Table 15.

EXAMPLES 77 TO 80

In order to obtain a sintered body of boron-containing niobium nitride comprising a mixture of boron-containing niobium powder and niobium powder, boron-containing niobium powder containing 6.9 mol % of boron and having a mean particle size of 1.0 $\mu$m was obtained in the same manner as in Example 43. Separately, 50 g of a niobium ingot was placed in an SUS 304-made reactor and hydrogen was continuously introduced thereinto at 400° C. for 12 hours. After cooling, the hydrogenated niobium cake was placed in an SUS 304-made pot containing iron-made balls and pulverized for 10 hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made spike mill, and wet-pulverized for 6 hours.

The resulting slurry was centrifuged and decanted to obtain a pulverized product. The pulverized product was dried in a vacuum under the conditions of $1.33 \times 10^2$ Pa and 50° C. Subsequently, the hydrogenated niobium powder was dehydrogenated under heating in a vacuum of $1.33 \times 10^{-2}$ Pa at 400° C. for 1 hour. The manufactured niobium powder had a mean particle size of 1.1 $\mu$m.

The thus-obtained boron-containing niobium powder was thoroughly mixed with niobium powder at an arbitrary ratio and after obtaining nitrides in the same manner as in Example 68, the nitrides each was granulated, molded and sintered to obtain sintered bodies. The capacitance and the LC value of each sintered body were measured and the results obtained are shown in Table 15.

TABLE 15

| | Type of Niobium Powder | Mixing ratio (boron-containing niobium powder:niobium powder) | Capacitance ($\mu F \cdot V/g$) | LC ($\mu A/g$) |
|---|---|---|---|---|
| Ex. | | | | |
| 75 | Reduced powder | 90:10 | 109000 | 36 |
| 76 | Reduced powder | 50:50 | 117000 | 28 |
| 77 | Reduced powder | 10:90 | 111000 | 41 |
| 78 | Pulverized powder | 80:20 | 113000 | 33 |
| 79 | Pulverized powder | 40:60 | 116000 | 27 |

TABLE 15-continued

|    | Type of Niobium Powder | Mixing ratio (boron-containing niobium powder:niobium powder) | Capacitance ($\mu F \cdot V/g$) | LC ($\mu A/g$) |
|----|------------------------|---------------------------------------------------------------|----------------------------------|-----------------|
| 80 | Pulverized powder | 20:80 | 114000 | 36 |

EXAMPLES 81 AND 82

50 Units of sintered bodies were prepared in each of Example 81 and Example 82 in same manner as in Example 43 and Example 44, respectively. These sintered bodies each was electrochemically formed using an aqueous 0.1% phosphoric acid solution at a voltage of 20 V for 200 minutes to form an oxide dielectric film on the surface. Subsequently, an operation of dipping each sintered body in an aqueous 60% manganese nitrate solution and then heating it at 220° C. for 30 minutes was repeated to form a manganese dioxide layer as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 16. The LC value is a value measured at room temperature by applying a voltage of 6.3 V for 1 minute.

EXAMPLES 83 AND 84

50 Units of sintered bodies were prepared in each of Example 83 and Example 84 in same manner as in Example 53 and Example 48, respectively. These sintered bodies each was electrochemically formed using an aqueous 0.1% phosphoric acid solution at a voltage of 20 V for 200 minutes to form an oxide dielectric film on the surface. Subsequently, an operation of dipping each sintered body in a mixed solution of an aqueous 35% lead acetate solution and an aqueous 35% ammonium persulfate solution (1:1 by volume) and then allowing the reaction to proceed at 40° C. for 1 hour was repeated to form a mixed layer of lead dioxide and lead sulfate as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 16. The LC value is a value measured at room temperature by applying a voltage of 6.3 V for 1 minute.

EXAMPLES 85 TO 88

50 Units of sintered bodies were prepared in each of Example 85, Example 86, Example 87 and Example 88 in same manner as in Example 58, Example 49, Example 67 and Example 71, respectively. These sintered bodies each was electrochemically formed using an aqueous 0.1% phosphoric acid solution at a voltage of 20 V for 200 minutes to form an oxide dielectric film on the surface. Subsequently, an operation of contacting the oxide dielectric film with an equivalent-weight mixed solution of an aqueous 10% ammonium persulfate solution and an aqueous 0.5% anthraquinone-sulfonic acid solution and then with a pyrrole vapor was repeated at least 5 times, whereby the other electrode (counter electrode) comprising polypyrrole was formed on the oxide dielectric film.

On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 16. The LC value is a value measured at room temperature by applying a voltage of 6.3 V for 1 minute.

EXAMPLES 89 TO 93

50 Units of sintered bodies were prepared in each of Example 89, Example 90, Example 91, Example 92 and Example 93 in same manner as in Example 59, Example 50, Example 65, Example 72 and Example 76, respectively. These sintered bodies each was electrochemically formed using an aqueous 0.1% phosphoric acid solution at a voltage of 20 V for 200 minutes to form an oxide dielectric film on the surface. Subsequently, the niobium sintered body was dipped into an aqueous solution containing 25% by mass of ammonium persulfate (Solution 1), then pulled up and dried at 80° C. for 30 minutes. Thereafter, the sintered body having formed thereon a dielectric material was dipped in an isopropanol solution containing 18% by mass of 3,4-ethylenedioxythiophene (Solution 2), then pulled up and left standing in an atmosphere of 60° C. for 10 minutes to allow the oxidation-polymerization to proceed. The resulting sintered body was again dipped in Solution 1 and then treated in the same manner as above. The operation from the dipping in Solution 1 until the oxidation polymerization was repeated 8 times. Then, the sintered body was washed with hot water at 50° C. for 10 minutes and dried at 100° C. for 30 minutes, whereby the other electrode (counter electrode) comprising electrically conducting poly(3,4-ethylenedioxythiophene) was formed.

On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 16. The LC value is a value measured at room temperature by applying a voltage of 6.3 V for 1 minute.

Comparative Examples 18 to 20

Into a nickel-made crucible, 20 g of potassium fluoroniobate thoroughly dried in a vacuum at 80° C. and sodium in a molar amount of 10 times the potassium fluoroniobate were charged and allowed to perform a reduction reaction at 1,000° C. for 20 hours in an argon atmosphere. After the completion of reaction, the reduction product was cooled, washed with water, washed with 95% sulfuric acid and then with water in sequence, dried in a vacuum and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried in a vacuum. The manufactured niobium powder had a mean particle size of 1.3 $\mu$m. Into an SUS 304-made reactor, 30 g of the thus-obtained niobium powder was charged and thereinto, nitrogen was continuously introduced at 300° C. for 0.5 to 4 hours to obtain niobium nitrides. The nitrogen amount of each nitride was determined using the nitrogen amount measuring apparatus manufactured by LECO which determines the nitrogen amount from the thermal conductivity. The ratio of the measured value to the separately measured weight of powder was designated as the nitrided amount, as a result, the nitrided amount here was from 0.02 to 0.30% by mass. Each niobium nitride was granulated, molded and sintered in the same manner as in Example 43 to obtain a sintered body. The thus-obtained 50 units of sintered bodies each was electrochemically formed using an aqueous 0.1% phosphoric acid solution at a voltage of 20 V for 200 minutes to form an oxide dielectric film on the surface. Thereafter, an operation of dipping the sintered body in an aqueous 60% manganese nitrate solution and then heating it at 220° C. for 30 minutes was repeated to form a manganese dioxide layer as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 16. The LC value is a value measured at room temperature by applying a voltage of 6.3 V for 1 minute.

Comparative Examples 21 to 23

In an SUS 304-made reactor, 50 g of a niobium ingot was placed and thereinto, hydrogen was continuously introduced at 400° C. for 12 hours. After cooling, the hydrogenated niobium cake was placed in an SUS 304-made pot containing iron-made balls and pulverized for 10 hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made wet grinding machine ("Atritor", trade name), and wet-pulverized for 6 hours. The resulting slurry was subjected to centrifugal sedimentation decanted to obtain a pulverized product. The pulverized product was vacuum-dried in a vacuum of $1.33 \times 10^2$ Pa at 50° C. Subsequently, the hydrogenated niobium powder was dehydrogenated under heating in a vacuum of $1.33 \times 10^{-2}$ Pa at 400° C. for 1 hour. The manufactured niobium powder had a mean particle size of 1.0 μm. Into an SUS 304-made reactor, 30 g of the obtained niobium powder was charged and thereinto, nitrogen was continuously introduced at 300° C. for 0.5 to 3 hours to obtain niobium nitrides. The nitrogen amount of each nitride was determined using a nitrogen amount measuring apparatus manufactured by LECO which determines the nitrogen amount from the thermal conductivity. The ratio of the measured value to the separately measured weight of powder was designated as the nitrided amount, as a result, the nitrided amount here was from 0.03 to 0.28% by mass. Each niobium nitride was granulated, molded and sintered in the same manner as in Example 43 to obtain a sintered body. The thus-obtained 50 units of sintered bodies each was electrochemically formed using an aqueous 0.1% phosphoric acid solution at a voltage of 20 V for 200 minutes to form an oxide dielectric film on the surface. Thereafter, an operation of contacting the oxide dielectric film with an equivalent-weight mixed solution of an aqueous 10% ammonium persulfate solution and an aqueous 0.5% anthraquinone sulfonic acid solution and then with a pyrrole vapor was repeated at least 5 times, whereby counter electrode comprising polypyrrole was formed on the oxide dielectric film. On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 16. The LC value is a value measured at room temperature by applying a voltage of 6.3 V for 1 minute.

TABLE 16

|  | Nitrogen Content (mass %) | Capacitance (μF) | LC (μA) | Number of Units Having LC Exceeding 100 μA |
|---|---|---|---|---|
| Example |  |  |  |  |
| 81 | — | 529 | 17 | 0/50 |
| 82 | — | 513 | 23 | 0/50 |
| 83 | — | 690 | 53 | 0/50 |
| 84 | — | 500 | 22 | 0/50 |
| 85 | — | 480 | 21 | 0/50 |
| 86 | — | 513 | 23 | 0/50 |
| 87 | — | 520 | 25 | 0/50 |
| 88 | 0.10 | 557 | 22 | 0/50 |
| 89 | — | 521 | 20 | 0/50 |
| 90 | — | 528 | 22 | 0/50 |
| 91 | — | 493 | 28 | 0/50 |
| 92 | — | 589 | 20 | 0/50 |
| 93 | 0.28 | 527 | 18 | 0/50 |
| Comparative Example |  |  |  |  |
| 18 | 0.02 | 399 | 46 | 1/50 |
| 19 | 0.09 | 393 | 42 | 1/50 |
| 20 | 0.30 | 384 | 30 | 0/50 |
| 21 | 0.03 | 454 | 48 | 1/50 |
| 22 | 0.14 | 449 | 44 | 0/50 |
| 23 | 0.28 | 459 | 40 | 0/50 |

EXAMPLE 94

Using 92 g of a niobium ingot and 1.9 g of rhenium powder, a rhenium-containing niobium ingot (alloy) having a rhenium content of 1 mol % was produced by arc melting. In an SUS 304-made reactor, 50 g of the obtained ingot was placed and hydrogen was continuously introduced thereinto at 400° C. for 10 hours. After cooling, the hydrogenated rhenium-containing niobium cake was placed in an SUS 304-made pot containing SUS-made balls and pulverized for 10 hours. Thereafter, this hydride was formed into a 20 vol % slurry with water, charged together with zirconia balls into an SUS 304-made spike mill, and wet-pulverized at 10° C. or less for 7 hours. The resulting slurry was subjected to centrifugal sedimentation and decanted to obtain a pulverized product. The pulverized product was dried in a vacuum under the conditions of $1.33 \times 10^2$ Pa and 50° C.

Subsequently, the hydrogenated rhenium-containing niobium powder was dehydrogenated under heating at $1.33 \times 10^{-2}$ Pa and 400° C. for 1 hour. The produced rhenium-containing niobium powder had a mean particle size of 1 μm and the rhenium content thereof was measured by the atomic absorption analysis and found to be 1 mol %. The thus-obtained rhenium-containing niobium powder was granulated in a vacuum of $4 \times 10^{-3}$ Pa at 1,000° C. Thereafter, the granulated cake was pulverized to obtain a granulated powder having a mean particle size of 100 μm.

The thus-obtained rhenium-containing niobium granulated powder was molded together with a 0.3-mmφ niobium lead wire to manufacture a molded article having a size of approximately 0.3×0.18×0.45 cm (weighing about 0.1 g).

This molded article was allowed to stand in a vacuum of $4 \times 10^{-3}$ Pa at 1,200° C. for 30 minutes and thereby, a sintered body was obtained. The sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the leakage current (hereinafter simply referred to as "LC") in an aqueous 20% phosphoric acid solution were measured. The results obtained are shown in Table 17.

EXAMPLES 95 TO 117

In the above-described manufacture of a niobium sintered body comprising at least one element of cerium, neodymium, titanium, rhenium, ruthenium, rhodium, palladium, silver, zinc, silicon, germanium, tin, phosphorus, arsenic and bismuth, a powder of cerium, neodymium, titanium, rhenium, ruthenium, rhodium, palladium, silver, zinc, silicon, germanium, tin, phosphorus, arsenic or bismuth and a niobium ingot were used at an arbitrary ratio and niobium ingots containing at least one element of cerium, neodymium, titanium, rhenium, ruthenium, rhodium, palladium, silver, zinc, silicon, germanium, tin, phosphorus, arsenic and bismuth were produced by arc melting. Thereafter, 50 g of each ingot was pulverized using the same apparatus as in Example 1 by changing the pulverization time. Using the thus-obtained niobium powder containing cerium, neodymium, titanium, rhenium, ruthenium, rhodium, palladium, silver, zinc, silicon, germanium, tin, phosphorus, arsenic or bismuth, sintered bodies were manufactured and each was measured on the capacitance and LC. The results obtained are shown in Table 17.

Rhenium has an effect of giving a lowest leakage current value and zinc, arsenic, phosphorus, germanium and tin follow in this order. The leakage current value is almost the same among cerium, neodymium, titanium, ruthenium, rhodium, palladium, silver, silicon and bismuth, and follows that of tin. Accordingly, in the present invention, the niobium powder most preferably contains rhenium and next preferably zinc.

Comparative Examples 24 to 27

For the purpose of comparison with Examples 94 to 117, four kinds of niobium powder not containing any of cerium, neodymium, titanium, rhenium, ruthenium, rhodium, palladium, silver, zinc, silicon, germanium, tin, phosphorus, arsenic and bismuth and having a different mean particle size were produced in the same manner as in Example 94. Using the produced niobium powder, sintered bodies were manufactured and measured on the capacitance and LC. The results obtained are shown in Table 17.

TABLE 17

|  | Composition (Molar ratio) | Mean Particle Size (µm) | Capacitance (µF · V/g) | LC (µA/g) |
| --- | --- | --- | --- | --- |
| Ex. |  |  |  |  |
| 94 | Nb(99.0), Re(1.0) | 1.0 | 113000 | 25 |
| 95 | Nb(99.9), Zn(0.1) | 1.0 | 105000 | 25 |
| 96 | Nb(99.0), As(1.0) | 1.0 | 104000 | 26 |
| 97 | Nb(98.0), P(2.0) | 1.0 | 105000 | 29 |

TABLE 17-continued

|  | Composition (Molar ratio) | Mean Particle Size (µm) | Capacitance (µF · V/g) | LC (µA/g) |
| --- | --- | --- | --- | --- |
| 98 | Nb(99.O), Ge(1.0) | 1.0 | 100000 | 38 |
| 99 | Nb(99.0), Sn(1.0) | 1.0 | 101000 | 39 |
| 100 | Nb(99,0), Ce(1.0) | 1.0 | 92000 | 43 |
| 101 | Nb(99.0), Nd(1.0) | 1.0 | 94000 | 40 |
| 102 | Nb(99.7), Ti(0.3) | 1.0 | 89000 | 39 |
| 103 | Nb(99.9), Ru(0.1) | 1.0 | 90000 | 44 |
| 104 | Nb(99.8), Rh(0.2) | 1.0 | 92000 | 39 |
| 105 | Nb(99.8), Pd(0.2) | 1.0 | 88000 | 40 |
| 106 | Nb(99.9), Ag(0.1) | 1.0 | 90000 | 42 |
| 107 | Nb(94.0), Si(6.O) | 1.0 | 95000 | 44 |
| 108 | Nb(99.8), Bi(0.2) | 1.0 | 91000 | 42 |
| 109 | Nb(95.0), Re(1.0), P(4.0) | 1.0 | 115000 | 29 |
| 110 | Nb(97.0), Re(0.5), As(2.5) | 1.0 | 111000 | 27 |
| 111 | Nb(99.0), Re(0.3), Ge(0.7) | 1.0 | 113000 | 26 |
| 112 | Nb(98.5), Re(1.0), Sn(0.5) | 1.0 | 112000 | 29 |
| 113 | Nb(92.0), Re(0.5), Si(7.5) | 1.0 | 118000 | 44 |
| 114 | Nb(98.0), Re(0.8), Zn(0.2), Ge(1.0) | 1.0 | 113000 | 22 |
| 115 | Nb(99.0), Re(1.0) | 0.5 | 246000 | 126 |
| 116 | Nb(99.0), Re(1.0) | 0.7 | 162000 | 55 |
| 117 | Nb(99.0), Re(1.0) | 1.3 | 96000 | 12 |
| Comp Ex. |  |  |  |  |
| 24 | Nb(100) | 0.5 | 182000 | 2120 |
| 25 | Nb(100) | 0.7 | 120000 | 1074 |
| 26 | Nb(100) | 1.0 | 87000 | 424 |
| 27 | Nb(100) | 1.3 | 74000 | 233 |

EXAMPLES 118 TO 122

In order to change the rhenium content of the rhenium-containing niobium powder, rhenium-containing niobium ingots having a rhenium content of 0.01 to 7 mol % were produced while varying the amounts of niobium and rhenium processed by the arc melting. Thereafter, using 50 g of each of the rhenium-containing niobium ingots having respective rhenium concentrations, sintered bodies were manufactured by the same operation as in Example 94 and each was measured on the capacitance and LC. The results obtained are shown in Table 18.

Comparative Examples 28 to 30

For the purpose of comparison with Example 94 and Examples 118 to 122, rhenium-containing niobium ingots containing 0 mol %, 11 mol % or 18 mol % of rhenium were produced. Thereafter, using 50 g of each of the rhenium-containing niobium ingots having respective rhenium concentrations, sintered bodies were manufactured by the same operation as in Example 94 and each was measured on the capacitance and LC. The results obtained are shown in Table 18.

TABLE 18

|  | Rhenium Content (mol %) | Mean Particle Size (µm) | Sintering Temperature (° C.) | Capacitance (µF · V/g) | LC (µA/g) |
| --- | --- | --- | --- | --- | --- |
| Example 118 | 0.01 | 1.0 | 1200 | 95000 | 65 |
| Example 119 | 0.10 | 1.0 | 1200 | 106000 | 39 |

TABLE 18-continued

| | Rhenium Content (mol %) | Mean Particle Size (μm) | Sintering Temperature (° C.) | Capacitance (μF · V/g) | LC (μA/g) |
|---|---|---|---|---|---|
| Example 94 | 1.0 | 1.0 | 1200 | 113000 | 25 |
| Example 120 | 2.0 | 1.0 | 1200 | 112000 | 28 |
| Example 121 | 3.0 | 1.0 | 1200 | 113000 | 26 |
| Example 122 | 7.0 | 1.0 | 1200 | 109000 | 32 |
| Comparative Example 28 | 0.0 | 1.0 | 1200 | 86000 | 420 |
| Comparative Example 29 | 11.0 | 1.0 | 1200 | 85000 | 59 |
| Comparative Example 30 | 18.1 | 1.0 | 1200 | 80000 | 62 |

EXAMPLES 123 TO 128

In an SUS 304-made reactor, 100 g of a niobium ingot was placed and hydrogen was continuously introduced thereinto at 400° C. for 10 hours. After cooling, the hydrogenated niobium cake was placed in an SUS 304-made pot containing SUS-made balls and pulverized for 10 hours. Thereafter, this hydride was formed into a 20 vol % slurry with water, charged together with zirconia balls into an SUS 304-made spike mill, and wet-pulverized for 7 hours. The resulting slurry was subjected to centrifugal sedimentation and decanted to obtain a pulverized product. The pulverized product was dried in a vacuum under the conditions of $1.33 \times 10^2$ Pa and 50° C. Subsequently, the hydrogenated niobium powder was dehydrogenated under heating at $1.33 \times 10^{-2}$ Pa and 400° C. for 1 hour. The manufactured niobium powder had a mean particle size of 1.1 μm.

Into this niobium powder, any one of rhenium oxide, rhenium sulfide and rhenium metal each having a mean particle size of about 1 μm was mixed at an arbitrary ratio. The obtained rhenium-containing niobium powder was granulated in a vacuum of $4 \times 10^{-3}$ Pa at 1,050° C. Thereafter, the granulated cake was cracked to obtain a granulated powder having a mean particle size of 90 μm. The thus-obtained rhenium-containing niobium granulated powder was molded together with a 0.3-mmφ niobium lead wire to manufacture a molded article having a size of approximately $0.3 \times 0.18 \times 0.45$ cm³ (weighing about 0.1 g). Subsequently, these molded articles were allowed to stand in a vacuum of $4 \times 10^{-3}$ Pa at 1,200° C. for 30 minutes to obtain sintered bodies. The resulting sintered bodies each was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC in an aqueous 20% phosphoric acid solution were measured. The results obtained are shown in Table 19.

TABLE 19

| | Species of Rhenium | Rhenium Content (mol %) | Capacitance (μF · V/g) | LC (μA/g) |
|---|---|---|---|---|
| Example 123 | ReO₂ | 2.8 | 115000 | 27 |
| Example 124 | ReO₃ | 1.2 | 112000 | 25 |
| Example 125 | Re₂O₇ | 3.5 | 114000 | 26 |
| Example 126 | ReS₂ | 2.3 | 115000 | 29 |
| Example 127 | Re₂S₇ | 0.5 | 112000 | 31 |
| Example 128 | Re | 1.0 | 114000 | 25 |

EXAMPLES 129 TO 133

In order to obtain a rhenium-containing niobium nitride, 10 g of rhenium-containing niobium powder containing 0.9 mol % of rhenium and having a mean particle size of 0.9 μm was manufactured in the same manner as in Example 94 and charged into an SUS 304-made reactor and thereinto, nitrogen was continuously introduced at 300° C. for 0.5 to 20 hours to obtain rhenium-containing niobium nitrides. The nitrogen amount of each nitride was determined using a nitrogen amount measuring apparatus manufactured by LECO, which determines the nitrogen amount from the thermal conductivity. The ratio of the measured value to the separately measured weight of powder was designated as the nitrided amount. The nitrided amount here was from 0.02 to 0.79% by mass.

The thus-obtained rhenium-containing niobium nitrides each was granulated, molded and sintered in the same manner as in Example 94 and each sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC value in an aqueous 20% phosphoric acid solution were measured. The results obtained are shown in Table 20.

TABLE 20

| | Rhenium Content (mol %) | Nitrogen Content (mass %) | Capacitance (μF · V/g) | LC μA/g |
|---|---|---|---|---|
| Example 129 | 0.9 | 0.02 | 124000 | 28 |
| Example 130 | 0.9 | 0.11 | 125000 | 25 |
| Example 131 | 0.9 | 0.27 | 125000 | 22 |
| Example 132 | 0.9 | 0.45 | 124000 | 22 |
| Example 133 | 0.9 | 0.79 | 125000 | 35 |

EXAMPLES 134 TO 136

In order to obtain a sintered body comprising a mixture of rhenium-containing niobium powder and niobium powder, a rhenium-containing niobium powder containing 10 mol % of rhenium and having a mean particle size of 1.0 μm was obtained in the same manner as in Example 94.

Separately, into a nickel-made crucible, 2,000 g of potassium fluoroniobate thoroughly dried in a vacuum at 80° C. and sodium in a molar amount of 10 times the potassium fluoroniobate were charged and allowed to perform a reduction reaction at 1,000° C. for 20 hours in an argon atmosphere. After the completion of reaction, the reduction product was cooled, washed with water, washed with 95% sulfuric acid and then with water in sequence, dried in a vacuum and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried in a vacuum. The produced niobium powder had a mean particle size of 1.2 μm.

The thus-obtained rhenium-containing niobium powder was thoroughly mixed with niobium powder at a ratio shown in Table 21 and the resulting mixtures each was granulated, molded and sintered in the same manner as in Example 94 to obtain sintered bodies. The capacitance and the LC value of each sintered body were measured and the results obtained are shown in Table 21.

EXAMPLES 137 TO 139

In order to obtain a sintered body of rhenium-containing niobium nitride comprising a mixture of rhenium-containing niobium powder and niobium powder, rhenium-containing niobium powder containing 10 mol % of rhenium and having a mean particle size of 1.0 μm was obtained in the same manner as in Example 94. Separately, 50 g of a niobium ingot was placed in an SUS 304-made reactor and hydrogen was continuously introduced thereinto at 400° C. for 12 hours. After cooling, the hydrogenated niobium cake was placed in an SUS 304-made pot containing iron-made balls and pulverized for 10 hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made spike mill, and wet-pulverized for 6 hours.

The resulting slurry was subjected to centrifugal sedimentation and decanted to obtain a pulverized product. The pulverized product was dried in a vacuum under the conditions of $1.33 \times 10^2$ Pa and 50° C. Subsequently, the hydrogenated niobium powder was dehydrogenated under heating in a vacuum of $133 \times 10^{-2}$ Pa at 400° C. for 1 hour. The manufactured niobium powder had a mean particle size of 1.1 μm.

The thus-obtained rhenium-containing niobium powder was thoroughly mixed with niobium powder at an arbitrary ratio and after obtaining nitrides in the same manner as in Example 131, the nitrides each was granulated, molded and sintered to obtain sintered bodies. The capacitance and the LC value of each sintered body were measured and the results obtained are shown in Table 21.

TABLE 21

| | Type of Niobium Powder | Mixing Ratio (rhenium-containing niobium powder: niobium powder) | Capacitance ($\mu F \cdot V/g$) | LC ($\mu A/g$) |
|---|---|---|---|---|
| Example 134 | Reduced powder | 90:10 | 104000 | 45 |
| Example 135 | Reduced powder | 50:50 | 110000 | 41 |
| Example 136 | Reduced powder | 10:90 | 114000 | 26 |
| Example 137 | Pulverized powder | 80:20 | 104000 | 46 |
| Example 138 | Pulverized powder | 40:60 | 111000 | 38 |
| Example 139 | Pulverized powder | 20:80 | 115000 | 25 |

EXAMPLES 140 AND 141

50 Units of sintered bodies were prepared in each of Example 140 and Example 141 in the same manner as in Example 94 and Example 116, respectively. These sintered bodies each was electrochemically formed using an aqueous 0.1% phosphoric acid solution at a voltage of 20 V for 200 minutes to form an oxide dielectric film on the surface. Subsequently, an operation of dipping each sintered body in an aqueous 60% manganese nitrate solution and then heating it at 220° C. for 30 minutes was repeated to form a manganese dioxide layer as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 22. The LC value is a value measured at room temperature by applying a voltage of 6.3 V for 1 minute.

EXAMPLES 142 AND 143

50 Units of sintered bodies were prepared in each of Example 142 and Example 143 in the same manner as in Example 95 and Example 128, respectively. These sintered bodies each was electrochemically formed using an aqueous 0.1% phosphoric acid solution at a voltage of 20 V for 200 minutes to form an oxide dielectric film on the surface. Subsequently, an operation of dipping each sintered body in a mixed solution of an aqueous 35% lead acetate solution and an aqueous 35% ammonium persulfate solution (1:1 by volume) and then allowing the reaction to proceed at 40° C. for 1 hour was repeated to form a mixed layer of lead dioxide and lead sulfate as the other electrode (counter electrode) on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 22. The LC value is a value measured at room temperature by applying a voltage of 6.3 V for 1 minute.

EXAMPLES 144 TO 147

50 Units of sintered bodies were prepared in each of Example 144, Example 145, Example 146 and Example 147 in the same manner as in Example 96, Example 115, Example 132 and Example 97, respectively. These sintered bodies each was electrochemically formed using an aqueous 0.1% phosphoric acid solution at a voltage of 20 V for 200 minutes to form an oxide dielectric film on the surface. Subsequently, an operation of contacting the oxide dielectric film with an equivalent-weight mixed solution of an aqueous 10% ammonium persulfate solution and an aqueous 0.5% anthraquinone-sulfonic acid solution and then with a pyrrole vapor was repeated at least 5 times, whereby the other electrode (counter electrode) comprising polypyrrole was formed on the oxide dielectric film.

On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 22. The LC value is a value measured at room temperature by applying a voltage of 6.3 V for 1 minute.

EXAMPLES 148 TO 153

50 Units of sintered bodies were prepared in each of Example 148, Example 149, Example 150, Example 151, Example 152 and Example 153 in the same manner as in Example 114, Example 122, Example 123, Example 124, Example 131 and Example 136, respectively. These sintered bodies each was electrochemically formed using an aqueous 0.1% phosphoric acid solution at a voltage of 20 V for 200 minutes to form an oxide dielectric film on the surface. Subsequently, the niobium sintered body was dipped into an aqueous solution containing 25% by mass of ammonium persulfate (Solution 1), then pulled up and dried at 80° C. for 30 minutes. Thereafter, the sintered body having formed thereon a dielectric material was dipped in an isopropanol solution containing 18% by mass of 3,4-ethylenedioxythiophene (Solution 2), then pulled up and left standing in an atmosphere of 60° C. for 10 minutes to allow the oxidation-polymerization to proceed. The resulting sintered body was again dipped in Solution 1 and then treated in the same manner as above. The operation from the dipping in Solution 1 until the oxidation polymerization was repeated 8 times. Then, the sintered body was washed with hot water at 50° C. for 10 minutes and dried at 100° C. for 30 minutes, whereby the other electrode (counter electrode) comprising electrically conducting poly(3,4-ethylenedioxythiophene) was formed.

On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 22. The LC value is a value measured at room temperature by applying a voltage of 6.3 V for 1 minute.

Comparative Examples 30 to 32

Into a nickel-made crucible, 2,000 g of potassium fluoroniobate thoroughly dried in a vacuum at 80° C. and sodium in a molar amount of 10 times the potassium fluoroniobate were charged and allowed to perform a reduction reaction at 1,000° C. for 20 hours in an argon atmosphere. After the completion of reaction, the reduction product was cooled, washed with water, washed with 95% sulfuric acid and then with water in sequence, dried in a vacuum and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried in a vacuum. The manufactured niobium powder had a mean particle size of 1.3 μm. Into an SUS 304-made reactor, 30 g of the thus-obtained niobium powder was charged and thereinto, nitrogen was continuously introduced at 300° C. for 0.5 to 4 hours to obtain niobium nitrides. The nitrogen amount of each nitride was determined using the nitrogen amount measuring apparatus manufactured by LECO which determines the nitrogen amount from the thermal conductivity. The ratio of the measured value to the separately measured weight of powder was designated as the nitrided amount, as a result, the nitrided amount here was from 0.02 to 0.30% by mass. Each niobium nitride was granulated, molded and sintered in the same manner as in Example 1 to obtain a sintered body.

The thus-obtained 50 units of sintered bodies each was electrochemically formed using an aqueous 0.1% phosphoric acid solution at a voltage of 20 V for 200 minutes to form an oxide dielectric film on the surface. Thereafter, an operation of dipping the sintered body in an aqueous 60% manganese nitrate solution and then heating it at 220° C. for 30 minutes was repeated to form a manganese dioxide layer as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 22. The LC value is a value measured at room temperature by applying a voltage of 6.3 V for 1 minute.

Comparative Examples 33 to 35

In an SUS 304-made reactor, 50 g of a niobium ingot was placed and thereinto, hydrogen was continuously introduced at 400° C. for 12 hours. After cooling, the hydrogenated niobium cake was placed in an SUS 304-made pot containing iron-made balls and pulverized for 10hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made wet grinding machine ("Atritor", trade name), and wet-pulverized for 6 hours. The resulting slurry was subjected to centrifugal sedimentation and decanted to obtain a pulverized product. The pulverized product was dried in a vacuum of $1.33 \times 10^2$ Pa at 50° C. Subsequently, the hydrogenated niobium powder was dehydrogenated under heating in a vacuum of $1.33 \times 10^{-2}$ Pa at 400° C. for 1 hour. The manufactured niobium powder had a mean particle size of 1.0 μm. Into an SUS 304-made reactor, 30 g of the obtained niobium powder was charged and thereinto, nitrogen was continuously introduced at 300° C. for 0.5 to 3 hours to obtain niobium nitrides. The nitrogen amount of each nitride was determined using a nitrogen amount measuring apparatus manufactured by LECO which determines the nitrogen amount from the thermal conductivity. The ratio of the measured value to the separately measured weight of powder was designated as the nitrided amount, as a result, the nitrided amount here was from 0.03 to 0.28% by mass. Each niobium nitride was granulated, molded and sintered in the same manner as in Example 94 to obtain a sintered body.

The thus-obtained 50 units of sintered bodies each was electrochemically formed using an aqueous 0.1% phosphoric acid solution at a voltage of 20 V for 200 minutes to form an oxide dielectric film on the surface. Thereafter, an operation of contacting the oxide dielectric film with an equivalent-weight mixed solution of an aqueous 10% ammonium persulfate solution and an aqueous 0.5% anthraquinone sulfonic acid solution and then with a pyrrole vapor was repeated at least 5 times, whereby the other electrode (counter electrode) comprising polypyrrole was formed on the oxide dielectric film. On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 22. The LC value is a value measured at room temperature by applying a voltage of 6.3 V for 1 minute.

TABLE 22

| | Nitrogen Content (wt %) | Capacitance (μF) | LC (μA) | Number of Units Having LC in Excess of 100 μA |
|---|---|---|---|---|
| Example 140 | — | 502 | 17 | 0/50 |
| Example 141 | — | 689 | 39 | 0/50 |
| Example 142 | — | 473 | 16 | 0/50 |
| Example 143 | — | 507 | 15 | 0/50 |
| Example 144 | — | 447 | 18 | 0/50 |
| Example 145 | — | 1058 | 83 | 0/50 |
| Example 146 | 0.45 | 558 | 15 | 0/50 |
| Example 147 | — | 468 | 20 | 0/50 |
| Example 148 | — | 497 | 14 | 0/50 |

TABLE 22-continued

|  | Nitrogen Content (wt %) | Capacitance (μF) | LC (μA) | Number of Units Having LC in Excess of 100 μA |
|---|---|---|---|---|
| Example 149 | — | 474 | 22 | 0/50 |
| Example 150 | — | 483 | 19 | 0/50 |
| Example 151 | — | 498 | 20 | 0/50 |
| Example 152 | 0.28 | 544 | 16 | 0/50 |
| Example 153 | — | 473 | 19 | 0/50 |
| Comparative Example 30 | 0.02 | 399 | 46 | 1/50 |
| Comparative Example 31 | 0.09 | 393 | 42 | 1/50 |
| Comparative Example 32 | 0.30 | 384 | 30 | 0/50 |
| Comparative Example 33 | 0.03 | 454 | 48 | 1/50 |
| Comparative Example 34 | 0.14 | 449 | 44 | 0/50 |
| Comparative Example 35 | 0.28 | 459 | 40 | 0/50 |

EXAMPLE 154

Using 184 g of a niobium ingot and 2.8 g of lanthanum powder, a lanthanum-containing niobium ingot (alloy) having a lanthanum content of 1 mol % was produced by arc melting. In an SUS 304-made reactor, 50 g of the obtained ingot was placed and hydrogen was continuously introduced thereinto at 400° C. for 10 hours. After cooling, the hydrogenated lanthanum-containing niobium cake was placed in an SUS 304-made pot containing SUS-made balls and pulverized for 10 hours. Thereafter, this hydride was formed into a 20 vol % slurry with water, charged together with zirconia balls into an SUS 304-made spike mill, and wet-pulverized for 7 hours. The resulting slurry was subjected to centrifugal sedimentation and decanted to obtain a pulverized product. The pulverized product was dried under reduced pressure in the conditions of 1.33×10² Pa and 50° C.

Subsequently, the hydrogenated lanthanum-containing niobium powder was dehydrogenated under heating at 1.33×10⁻² Pa and 400° C. for 1 hour. The produced lanthanum-containing niobium powder had a mean particle size of 1.0 μm and the lanthanum content thereof was 1 mol %. The thus-obtained lanthanum-containing niobium powder was granulated under reduced pressure of 4×10⁻³ Pa at 1,100° C. Thereafter, the granulated cake was pulverized to obtain a granulated powder having a mean particle size of 100 μm.

The thus-obtained lanthanum-containing niobium granulated powder was molded together with a 0.3-mmφ niobium lead wire to manufacture a molded article having a size of approximately 0.3×0.18×0.45 cm (weighing about 0.1 g).

This molded article was allowed to stand under reduced pressure of 4×10⁻³ Pa at 1,200° C. for 30 minutes and thereby, a sintered body was obtained. The sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the leakage current (hereinafter simply referred to as "LC") in an aqueous 20% phosphoric acid solution were measured. The results obtained are shown in Table 23 (No.1 and No.2).

EXAMPLES 155 TO 195

In the above-described manufacture of a niobium sintered body comprising at least one element of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium, a powder of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium or tellurium and a niobium powder were used at an arbitrary ratio to produce niobium ingots containing at least one element of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium by arc melting. Thereafter, 500 g of each ingot was pulverized using the same apparatus as in Example 154 by changing the pulverization time. Using the thus-obtained niobium powder containing at least one element selected from the group consisting of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium, sintered bodies were manufactured and each was measured on the capacitance and LC. The results obtained are shown in Table 23 (No.1 and No.2).

Comparative Examples 36 to 39

For the purpose of comparison with Examples 154 to 195, four kinds of niobium powder not containing any of rubidium, cesium, magnesium, strontium, barium, scandium, yttrium, lanthanum, praseodymium, samarium, europium, gadolinium, terbium, dysprosium, holmium, erbium, thulium, ytterbium, lutetium, hafnium, vanadium, osmium, iridium, platinum, gold, cadmium, mercury, lead, sulfur, selenium and tellurium and having a different mean particle size were produced in the same manner as in Example 154. Using the produced niobium powder, sintered bodies were manufactured and measured on the capacitance and LC. The results obtained are shown in Table 23 (No.1 and No.2).

TABLE 23

(NO.1)

| | Composition | | Mean Particle Size (μm) | Capacitance (μF · V/g) | LC (μA/g) |
|---|---|---|---|---|---|
| | Element | Molar Ratio | | | |
| Example 154 | Nb:La | 99:1 | 1.0 | 108000 | 21 |
| Example 155 | Nb:La | 99:1 | 0.5 | 228000 | 125 |
| Example 156 | Nb:La | 99:1 | 0.7 | 151000 | 55 |
| Example 157 | Nb:La | 99:1 | 1.3 | 92000 | 11 |
| Example 158 | Nb:Sc | 99.9:0.1 | 1.0 | 106000 | 36 |
| Example 159 | Nb:Y | 97:3 | 1.0 | 106000 | 23 |
| Example 160 | Nb:Pr | 99:1 | 1.0 | 105000 | 32 |
| Example 161 | Nb:Sm | 99:1 | 1.0 | 107000 | 37 |
| Example 162 | Nb:Eu | 99.5:0.5 | 1.0 | 104000 | 39 |
| Example 163 | Nb:Gd | 98.5:1.5 | 1.0 | 103000 | 40 |
| Example 164 | Nb:Tb | 99.8:0.2 | 1.0 | 105000 | 41 |
| Example 165 | Nb:Dy | 99:1 | 1.0 | 107000 | 39 |
| Example 166 | Nb:Ho | 99.7:0.3 | 1.0 | 106000 | 44 |

TABLE 23-continued (NO.1)

| | Composition | | Mean Particle Size (μm) | Capacitance (μF · V/g) | LC (μA/g) |
|---|---|---|---|---|---|
| | Element | Molar Ratio | | | |
| Example 167 | Nb:Er | 99.5:0.5 | 1.0 | 106000 | 25 |
| Example 168 | Nb:Tm | 99.8:0.2 | 1.0 | 103000 | 37 |
| Example 169 | Nb:Yb | 97:3 | 1.0 | 105000 | 26 |
| Example 170 | Nb:Lu | 95:5 | 1.0 | 104000 | 27 |
| Example 171 | Nb:Hf | 93:7 | 1.0 | 105000 | 35 |
| Example 172 | Nb:V | 99.9:0.1 | 1.0 | 109000 | 48 |
| Example 173 | Nb:Os | 99.9:0.1 | 1.0 | 107000 | 43 |
| Example 174 | Nb:Ir | 99.9:0.1 | 1.0 | 107000 | 44 |
| Example 175 | Nb:Pt | 99.8:0.2 | 1.0 | 102000 | 37 |
| Example 176 | Nb:Au | 99.8:0.2 | 1.0 | 101000 | 41 |
| Example 177 | Nb:Cd | 99.7:0.3 | 1.0 | 109000 | 35 |
| Example 178 | Nb:Hg | 99.9:0.1 | 1.0 | 101000 | 43 |
| Example 179 | Nb:Pb | 99.9:0.1 | 1.0 | 102000 | 36 |
| Example 180 | Nb:S | 95:5 | 1.0 | 108000 | 35 |

TABLE 23

(No.2)

| | Composition | | Mean Particle Size (μm) | Capacitance (μF · V/g) | LC (μA/g) |
|---|---|---|---|---|---|
| | Element | Molar Ratio | | | |
| Example 181 | Nb:Se | 99:1 | 1.0 | 108000 | 35 |
| Example 182 | Nb:Te | 98:2 | 1.0 | 107000 | 28 |
| Example 183 | Nb:Hf:Lu | 92.9:7:0.1 | 0.7 | 145000 | 75 |
| Example 184 | Nb:Cs | 99.95:0.05 | 0.7 | 153000 | 120 |
| Example 185 | Nb:Y:Mg | 97.99:2:0.01 | 0.7 | 150000 | 81 |
| Example 186 | Nb:Er:Sr | 95.9:4:0.1 | 0.7 | 146000 | 132 |
| Example 187 | Nb:Yb:Ba | 96.9:3:0.1 | 0.7 | 151000 | 143 |
| Example 188 | Nb:La:Hf | 93:1:6 | 0.5 | 210000 | 133 |
| Example 189 | Nb:Y:La:Lu | 97.5:1:1:0.5 | 0.5 | 225000 | 156 |
| Example 190 | Nb:La:Er:Yb | 96.5:2:0.5:1 | 0.5 | 208000 | 161 |
| Example 191 | Nb:Hf:Te | 93:1:5:1 | 0.5 | 213000 | 171 |
| Example 192 | Nb:Y:Os:Ir | 96.5:2:0.5:1 | 1.0 | 107000 | 45 |
| Example 193 | Nb:La:Cd:S | 93.4:1.5:0.1:5 | 1.0 | 106000 | 39 |
| Example 194 | Nb:Er:Hf:Te | 95:0.5:4:0.5 | 0.7 | 154000 | 66 |
| Example 195 | Nb:Gd:Yb:Lu:Se | 98:0.5:0.5:0.5:0.5 | 0.7 | 143000 | 78 |
| Comp. Example 36 | Nb | 100 | 0.5 | 182000 | 2120 |
| Comp. Example 37 | Nb | 100 | 0.7 | 120000 | 1074 |

EXAMPLES 196 TO 202

In order to change the lanthanum content of the lanthanum-containing niobium powder, lanthanum-containing niobium ingots having a lanthanum content of 0.01 to 20 mol % were produced by varying the amounts of niobium and lanthanum processed by the arc melting. Thereafter, using 500 g of each of the lanthanum-containing niobium ingots having respective lanthanum concentrations, sintered bodies were manufactured by the same operation as in Example 154 and each was measured on the capacitance and LC. The results obtained are shown in Table 24.

TABLE 24

| | Lanthanum Content (mol %) | Mean Particle Size (μm) | Sintering Temp. (° C.) | Capacitance (μF · V/g) | LC (μA/g) |
|---|---|---|---|---|---|
| Comp. Example 38 | 0.00 | 1.0 | 1200 | 87000 | 424 |
| Example 196 | 0.01 | 1.0 | 1200 | 95000 | 65 |
| Example 197 | 0.01 | 1.0 | 1200 | 106000 | 33 |
| Example 154 | 1 | 1.0 | 1200 | 108000 | 21 |
| Example 198 | 2 | 1.0 | 1200 | 110000 | 23 |
| Example 199 | 3 | 1.0 | 1200 | 109000 | 23 |
| Example 200 | 7 | 1.0 | 1200 | 109000 | 30 |
| Example 201 | 11 | 1.0 | 1200 | 85000 | 59 |
| Example 202 | 20 | 1.0 | 1200 | 79000 | 66 |

EXAMPLES 203 TO 207

In an SUS 304-made reactor, 1,000 g of a niobium ingot was placed and hydrogen was continuously introduced thereinto at 400° C. for 10 hours. After cooling, the hydrogenated niobium cake was placed in an SUS 304-made pot containing SUS-made balls and pulverized for 10 hours. Thereafter, this hydride was formed into a 20 vol % slurry with water, charged together with zirconia balls into an SUS 304-made spike mill, and wet-pulverized for 7 hours. The resulting slurry was subjected to centrifugal sedimentation and decanted to obtain a pulverized product. The pulverized product was dried under reduced pressure in the conditions of $1.3 \times 10^2$ Pa and 50° C. Subsequently, the hydrogenated niobium powder was dehydrogenated under heating at $1.3 \times 10^{-2}$ Pa and 400° C. for 1 hour. The manufactured niobium powder had a mean particle size of 1.0 μm. Into this niobium powder, any one of lanthanum oxide, lanthanum oxalate, hydrogenated lanthanum, lanthanum nitrate and lanthanum (metal) each having a mean particle size of about 1 μm was mixed at an arbitrary ratio. The obtained lanthanum-containing niobium powder was granulated under reduced pressure of $4 \times 10^{-3}$ Pa at 1,050° C. Thereafter, the granulated cake was pulverized to obtain a granulated powder having a mean particle size of 90 μm. The thus-obtained lanthanum-containing niobium granulated powder was molded together with a 0.3-mmφ niobium wire to manufacture a molded article having a size of approximately 0.3×0.18×0.45 cm (weighing about 0.1 g). Subsequently, these molded articles were allowed to stand under reduced pressure of $4 \times 10^{-3}$ Pa at 1,250° C. for 30 minutes to obtain sintered bodies. The resulting sintered bodies each was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC in an aqueous 20% phosphoric acid solution were measured. The results obtained are shown in Table 25.

TABLE 25

| | Species of Lanthanum | Lanthanum Content (mol %) | Capacitance (μF · V/g) | LC (μA/g) |
|---|---|---|---|---|
| Example 203 | lanthanum oxide | 0.5 | 109000 | 29 |
| Example 204 | lanthanum oxalate | 1.2 | 112000 | 23 |
| Example 205 | hydrogenated lanthanum | 3.5 | 113000 | 22 |

TABLE 25-continued

|  | Species of Lanthanum | Lanthanum Content (mol %) | Capacitance (μF · V/g) | LC (μA/g) |
|---|---|---|---|---|
| Example 206 | lanthanum nitrate | 0.8 | 108000 | 29 |
| Example 207 | lanthanum | 1.1 | 108000 | 26 |

EXAMPLES 208 TO 212

In order to obtain a lanthanum-containing niobium nitride, 10 g of lanthanum-containing niobium powder containing 0.9 mol % of lanthanum and having a mean particle size of 0.9 μm was manufactured in the same manner as in Example 154 and charged into an SUS 304-made reactor and thereinto, nitrogen was continuously introduced at 300° C. for 0.5 to 20 hours to obtain lanthanum-containing niobium nitrides. The nitrogen amount of each nitride was determined using a nitrogen amount measuring apparatus manufactured by LECO which determines the nitrogen amount from the thermal conductivity. The ratio of the measured value to the separately measured mass of powder was designated as the nitrided amount. The nitrided amount here was from 0.02 to 0.81% by mass.

The thus-obtained lanthanum-containing niobium nitrides each was granulated, molded and sintered in the same manner as in Example 154 and each sintered body obtained was electrochemically formed in an aqueous 0.1% phosphoric acid solution at a temperature of 80° C. for 200 minutes by applying a voltage of 20 V to form a dielectric layer on the surface. Thereafter, the capacitance in 30% sulfuric acid and the LC value in an aqueous 20% phosphoric acid solution were measured. The results obtained are shown in Table 26.

TABLE 26

|  | Lanthanum Content (mol %) | Nitrogen Content (mass %) | Capacitance (μF · V/g) | LC (μA/g) |
|---|---|---|---|---|
| Example 208 | 0.9 | 0.02 | 120000 | 29 |
| Example 209 | 0.9 | 0.12 | 122000 | 19 |
| Example 210 | 0.9 | 0.26 | 121000 | 19 |
| Example 211 | 0.9 | 0.45 | 124000 | 23 |
| Example 212 | 0.9 | 0.81 | 120000 | 24 |

EXAMPLES 213 TO 215

In order to obtain a sintered body comprising a mixture of lanthanum-containing niobium powder and niobium powder, a lanthanum-containing niobium powder containing 10 mol % of lanthanum and having a mean particle size of 1.0 μm was obtained in the same manner as in Example 154.

Separately, into a nickel-made crucible, 2,000 g of potassium fluoroniobate thoroughly dried under reduced pressure at 80° C. and sodium in a molar amount of 10 times the potassium fluoroniobate were charged and allowed to perform a reduction reaction at 1,000° C. for 20 hours in an argon atmosphere. After the completion of reaction, the reduction product was cooled, washed with water, washed with 95% sulfuric acid and then with water in sequence, dried under reduced pressure and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried under reduced pressure. The produced niobium powder had a mean particle size of 1.2 μm.

The thus-obtained lanthanum-containing niobium powder was thoroughly mixed with niobium powder at a ratio shown in Table 27 and the resulting mixtures each was granulated, molded and sintered in the same manner as in Example 154 to obtain sintered bodies. The capacitance and the LC value of each sintered body were measured and the results obtained are shown in Table 27.

EXAMPLES 216 TO 218

In order to obtain a sintered body of lanthanum-containing niobium nitride comprising a mixture of lanthanum-containing niobium powder and niobium powder, lanthanum-containing niobium powder containing 10 mol % of lanthanum and having a mean particle size of 1.0 μm was obtained in the same manner as in Example 1. Separately, 50 g of a niobium ingot was placed in an SUS 304-made reactor and hydrogen was continuously introduced thereinto at 400° C. for 12 hours. After cooling, the hydrogenated niobium cake was placed in an SUS 304-made pot containing iron-made balls and pulverized for 10 hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made spike mill, and wet-pulverized for 6 hours.

The resulting slurry was subjected to centrifugal sedimentation and decanted to obtain a pulverized product. The pulverized product was dried under reduced pressure in the conditions of $1.3 \times 10^2$ Pa and 50° C. Subsequently, the hydrogenated niobium powder was dehydrogenated under heating under reduced pressure of $1.33 \times 10^{-2}$ Pa at 400° C. for 1 hour. The manufactured niobium powder had a mean particle size of 1.1 μm.

The thus-obtained lanthanum-containing niobium powder was thoroughly mixed with niobium powder at an arbitrary ratio and after obtaining nitrides in the same manner as in Example 210, the nitrides each was granulated, molded and sintered to obtain sintered bodies. The capacitance and the LC value of each sintered body were measured and the results obtained are shown in Table 27.

TABLE 27

|  | Mixing ratio (lanthanum-containing niobium powder: niobium powder) | Capacitance (μF · V/g) | LC (μA/g) |
|---|---|---|---|
| Example 213 | 90:10 | 91000 | 41 |
| Example 214 | 50:50 | 102000 | 30 |
| Example 215 | 10:90 | 108000 | 22 |

TABLE 27-continued

| | Mixing ratio (lanthanum-containing niobium powder: niobium powder) | Capacitance ($\mu F \cdot V/g$) | LC ($\mu A/g$) |
|---|---|---|---|
| Example 216 | 80:20 | 94000 | 34 |
| Example 217 | 40:60 | 102000 | 25 |
| Example 218 | 20:80 | 108000 | 19 |

EXAMPLES 219 AND 220

50 Units of sintered bodies were prepared in each of Example 219 and Example 220 in same manner as in Example 154 and Example 182, respectively. These sintered bodies each was electrochemically oxidized using an aqueous 0.1% phosphoric acid solution at a voltage of 20 V for 6 hours to form an oxide dielectric film on the surface. Subsequently, an operation of dipping each sintered body in an aqueous 60% manganese nitrate solution and then heating it at 220° C. for 30 minutes was repeated to form a manganese dioxide layer as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 28. The LC value is a value measured at room temperature by applying a voltage of 6.3 V for 1 minute.

EXAMPLES 221 AND 222

50 Units of sintered bodies were prepared in each of Example 221 and Example 222 in same manner as in Example 159 and Example 204, respectively. These sintered bodies each was electrochemically oxidized using an aqueous 0.1% phosphoric acid solution at a voltage of 20 V for 6 hours to form an oxide dielectric film on the surface. Subsequently, an operation of dipping each sintered body in a mixed solution of an aqueous 35% lead acetate solution and an aqueous 35% ammonium persulfate solution (1:1 by volume) and then allowing the reaction to proceed at 40° C. for 1 hour was repeated to form a mixed layer of lead dioxide and lead sulfate as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 28. The LC value is a value measured at room temperature by applying a voltage of 6.3 V for 1 minute.

EXAMPLES 223 TO 226

50 Units of sintered bodies were prepared in each of Example 223, Example 224, Example 225 and Example 226 in same manner as in Example 167, Example 189, Example 211 and Example 215, respectively. These sintered bodies each was electrochemically oxidized using an aqueous 0.1% phosphoric acid solution at a voltage of 20 V for 6 hours to form an oxide dielectric film on the surface. Subsequently, an operation of contacting the oxide dielectric film with an equivalent-weight mixed solution of an aqueous 10% ammonium persulfate solution and an aqueous 0.5% anthraquinone-sulfonic acid solution and then with a pyrrole vapor was repeated at least 5 times, whereby the other electrode (counter electrode) comprising polypyrrole was formed on the oxide dielectric film.

On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 28. The LC value is a value measured at room temperature by applying a voltage of 6.3 V for 1 minute.

EXAMPLES 227 TO 231

50 Units of sintered bodies were prepared in each of Example 227, Example 228, Example 229, Example 230 and Example 231 in same manner as in Example 170, Example 191, Example 205, Example 210 and Example 218, respectively. These sintered bodies each was electrochemically oxidized using an aqueous 0.1% phosphoric acid solution at a voltage of 20 V for 6 hours to form an oxide dielectric film on the surface. Subsequently, the niobium sintered body was dipped into an aqueous solution containing 25% by mass of ammonium persulfate (Solution 1), then pulled up and dried at 80° C. for 30 minutes. Thereafter, the sintered body having formed thereon a dielectric material was dipped in an isopropanol solution containing 18% by mass of 3,4-ethylenedioxythiophene (Solution 2), then pulled up and left standing in an atmosphere of 60° C. for 10 minutes to allow the oxidation-polymerization to proceed. The resulting sintered body was again dipped in Solution 1 and then treated in the same manner as above. The operation from the dipping in Solution 1 until the oxidation polymerization was repeated 8 times. Then, the sintered body was washed with hot water at 50° C. for 10 minutes and dried at 100° C. for 30 minutes, whereby the other electrode (counter electrode) comprising electrically conducting poly(3,4-ethylenedioxythiophene) was formed.

On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 28. The LC value is a value measured at room temperature by applying a voltage of 6.3 V for 1 minute.

Comparative Examples 40 to 42

Into a nickel-made crucible, 2,000 g of potassium fluoroniobate thoroughly dried under reduced pressure at 80° C. and sodium in a molar amount of 10 times the potassium fluoroniobate were charged and allowed to perform a reduction reaction at 1,000° C. for 20 hours in an argon atmosphere. After the completion of reaction, the reduction product was cooled, washed with water, washed with 95% sulfuric acid and then with water in sequence, dried under reduced pressure and pulverized for 40 hours using a ball mill of an alumina pot containing silica alumina balls. The pulverized product was dipped and stirred in a 3:2 (by mass) mixed solution of 50% nitric acid and 10% aqueous hydrogen peroxide. Thereafter, the pulverized product was thoroughly washed with water until the pH reached 7 to remove impurities, and dried under reduced pressure. The manufactured niobium powder had a mean particle size of 1.3 μm. Into an SUS 304-made reactor, 30 g of the thus-obtained niobium powder was charged and thereinto, nitrogen was continuously introduced at 300° C. for 0.5 to 4 hours to obtain niobium nitrides. The nitrogen amount of each nitride was determined using the nitrogen amount measuring apparatus manufactured by LECO which determines the nitrogen amount from the thermal conductivity. The ratio of the measured value to the separately measured mass of powder was designated as the nitrided amount, as a result, the nitrided amount here was from 0.02 to 0.30% by mass. Each niobium nitride was granulated, molded and sintered in the same manner as in Example 154 to obtain a sintered body. The thus-obtained 50 units of sintered bodies each was electrochemically oxidized using an aqueous 0.1% phosphoric acid solution at a voltage of 20 V for 6 hours to form an oxide dielectric film on the surface. Thereafter, an operation of dipping the sintered body in an aqueous 60% manganese nitrate solution and then heating it at 220° C. for 30 minutes was repeated to form a manganese dioxide layer as the other electrode (counter electrode) layer on the oxide dielectric film. On this counter electrode layer, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 28. The LC value is a value measured at room temperature by applying a voltage of 6.3 V for 1 minute.

Comparative Examples 43 to 45

In an SUS 304-made reactor, 50 g of a niobium ingot was placed and thereinto, hydrogen was continuously introduced at 400° C. for 12 hours. After cooling, the hydrogenated niobium cake was placed in an SUS 304-made pot containing iron-made balls and pulverized for 10 hours. This pulverized product was charged into the same SUS 304-made reactor as above and again hydrogenated under the above-described conditions. Thereafter, this hydride was formed into a 20 vol % slurry with water, charged together with zirconia balls into an SUS 304-made wet grinding machine ("Atritor", trade name), and wet-pulverized for 6 hours. The resulting slurry was subjected to centrifugal sedimentation and decanted to obtain a pulverized product. The pulverized product was dried under reduced pressure of $1.33 \times 10^2$ Pa at 50° C. Subsequently, the hydrogenated niobium powder was dehydrogenated under heating under reduced pressure of $1.33 \times 10^{-2}$ Pa at 400° C. for 1 hour. The manufactured niobium powder had a mean particle size of 1.0 μm. Into an SUS 304-made reactor, 30 g of the obtained niobium powder was charged and thereinto, nitrogen was continuously introduced at 300° C. for 0.5 to 3 hours to obtain niobium nitrides. The nitrogen amount of each nitride was determined using a nitrogen amount measuring apparatus manufactured by LECO which determines the nitrogen amount from the thermal conductivity. The ratio of the measured value to the separately measured mass of powder was designated as the nitrided amount, as a result, the nitrided amount here was from 0.03 to 0.28% by mass. Each niobium nitride was granulated, molded and sintered in the same manner as in Example 154 to obtain a sintered body. The thus-obtained 50 units of sintered bodies each was electrochemically oxidized using an aqueous 0.1% phosphoric acid solution at a voltage of 20 V for 6 hours to form an oxide dielectric film on the surface. Thereafter, an operation of contacting the oxide dielectric film with an equivalent-weight mixed solution of an aqueous 10% ammonium persulfate solution and an aqueous 0.5% anthraquinone sulfonic acid solution and then with a pyrrole vapor was repeated at least 5 times, whereby the other electrode (counter electrode) comprising polypyrrole was formed on the oxide dielectric film. On this counter electrode, a carbon layer and a silver paste layer were stacked in this order. After mounting a lead frame thereon, the device as a whole was molded with an epoxy resin to manufacture a chip-type capacitor. The average capacitance and the average LC value of the chip-type capacitors (n=50 units in each Example) are shown in Table 28. The LC value is a value measured at room temperature by applying a voltage of 6.3 V for 1 minute.

TABLE 28

| | Nitrogen Content (wt %) | Capacitance (μF) | LC (μA) | Number of Units Having LC in Excess of 100 μA |
|---|---|---|---|---|
| Example 219 | — | 486 | 15 | 0/50 |
| Example 220 | — | 471 | 20 | 0/50 |
| Example 221 | — | 482 | 16 | 0/50 |
| Example 222 | — | 504 | 17 | 0/50 |
| Example 223 | — | 480 | 18 | 0/50 |
| Example 224 | — | 1012 | 109 | 0/50 |
| Example 225 | 0.45 | 546 | 16 | 0/50 |
| Example 226 | — | 488 | 15 | 0/50 |
| Example 227 | — | 463 | 19 | 0/50 |
| Example 228 | — | 937 | 119 | 0/50 |
| Example 229 | — | 509 | 15 | 0/50 |
| Example 230 | 0.26 | 532 | 12 | 0/50 |
| Example 231 | — | 491 | 13 | 0/50 |
| Comparative Example 40 | 0.02 | 398 | 47 | 4/50 |
| Comparative Example 41 | 0.08 | 392 | 41 | 3/50 |
| Comparative Example 42 | 0.30 | 383 | 40 | 0/50 |
| Comparative Example 43 | 0.03 | 455 | 47 | 2/50 |
| Comparative Example 44 | 0.15 | 444 | 43 | 0/50 |
| Comparative Example 45 | 0.28 | 460 | 41 | 0/50 |

EXAMPLE 232 TO 238

Comparative Example 46 to 48

Heat resistance of the capacitor were measured as follows.

50 units of the capacitors prepared in each examples and comparative examples shown in Table 29 was loaded on a multilayer substrate having a width of 1.5 mm with soldering. This substrate was passed through reflow furnace with passing time of 30 seconds with three times repeating operation, and practical heat history (for example, heat history of three soldering: soldering for parts loaded on the surface of the substrate, soldering for parts loaded on the back side of the substrate, and soldering for parts loaded later on) was evaluated.

LC value of the capacitor before passing through the reflow furnace and after passing through the reflow furnace with three times were measured, and the average values and increasing rate (LC value after reflow operation/LC value before reflow operation) were shown in Table 29. As a result, the capacitor of the present invention had the LC increasing rate of being lower than 5 times, preferably lower than three times, and no capacitor had the LC value over 100 μA.

TABLE 29

|  | Capacitor Constitution Species of Anode/ Species of Cathode | Examples for producing a chip (Comp. Ex.) | LC value before reflow/ after reflow ($\mu$A) | LC increasing rate | Number of Units Having LC in Excess of 100 $\mu$A |
|---|---|---|---|---|---|
| Example 232 | Nb-W/MnO$_2$ | Example 34 | 25/55 | 2.2 times | 0/50 |
| Example 233 | Nb-B/MnO$_2$ | Example 81 | 17/39 | 2.3 times | 0/50 |
| Example 234 | Nb-B-Al/ Polypyrrole | Example 86 | 23/51 | 2.2 times | 0/50 |
| Example 235 | Nb-Re-Zn-Ge/ Polythiophene | Example 148 | 14/35 | 2.3 times | 0/50 |
| Example 236 | Nb-Y/PbO$_2$ | Example 221 | 16/38 | 2.4 times | 0/50 |
| Example 237 | Nb-La/ Polythiophene | Example 230 | 12/30 | 2.5 times | 0/50 |
| Example 238 | Nb-Nd/ Polythiophene | *1 | 21/39 | 1.9 times | 0/50 |
| Comp. Example 46 | Nb/MnO$_2$ | Comp. Example 40 | 47/277 | 5.9 times | 50/50 |
| Comp. Example 47 | Nb/MnO$_2$ | Comp. Example 42 | 40/208 | 5.2 times | 50/50 |
| Comp. Example 48 | Nb/Polypyrrole | Comp. Example 45 | 41/209 | 5.1 times | 50/50 |

*1 A sintered body used was obtained by the same method as in Example 101, and a chip type capacitor was produced by the same method as in Example 148.

What is claimed is:

1. A niobium powder for capacitors comprising at least one element selected from the group consisting of neodymium, rhenium, lanthanum, erbium, ytterbium and lutetium.

2. The niobium powder for capacitors as claimed in claim 1, wherein said at least one element is rhenium.

3. The niobium powder for capacitors as claimed in claim 1, wherein said at least one element is neodymium.

4. The niobium powder for capacitors as claimed in claim 1 comprising at least one element selected from the group consisting of lanthanum, erbium, ytterbium and lutetium.

5. The niobium powder for capacitors as claimed in claim 4, wherein said at least one element is lanthanum.

6. The niobium powder as claimed in claim 1, wherein said at least one element is contained in an amount of about 10 mol % or less in said niobium powder.

7. The niobium powder as claimed in claim 6, wherein said at least one element is contained in an amount of about 0.01 to about 10 mol % in said niobium powder.

8. The niobium powder as claimed in claim 7, wherein said at least one element is contained in an amount of about 0.1 to about 7 mol % in said niobium powder.

9. The niobium powder as claimed in claim 1, wherein said niobium powder has a mean particle size of about 0.05 $\mu$m to about 5 $\mu$m.

10. The niobium powder as claimed in claim 9, wherein said niobium powder has a mean particle size of about 0.2 $\mu$m to about 4 $\mu$m.

11. The niobium powder as claimed in claim 1, wherein said niobium powder has a BET specific surface area of about 0.5 to about 40 m$^2$/g.

12. The niobium powder as claimed in claim 11, wherein said niobium powder has a BET specific surface area of about 1 to about 20 m$^2$/g.

13. A nobium powder for capacitors comprising at least one element selected from the group consisting of tungsten, aluminum, neodymium, rhenium, zinc, yttrium, lanthanum, erbium, ytterbium and lutetium, and further comprising at least one element selected from the group consisting of nitrogen, carbon, boron, and sulfur.

14. The niobium powder as claimed in claim 13, wherein at least one element selected from the group consisting of nitrogen, carbon, boron and sulfur is contained in an amount of about 200,000 ppm or less.

15. The niobium powder as claimed in claim 14, wherein at least one element selected from the group consisting of nitrogen, carbon, boron, and sulfur is contained in an amount of about 50 ppm to about 200,000 ppm.

16. A niobium granulated product prepared by granulating a niobium powder for capacitors comprising at least one element selected from the group consisting of tungsten, aluminum, neodymium, rhenium, zinc, yttrium, lanthanum, erbium, ytterbium and lutetium to have a mean particle size of 10 $\mu$m to 500 $\mu$m.

17. The niobium granulated product as claimed in claim 16, wherein the mean particle size is about 30 $\mu$m to about 250 $\mu$m.

18. A sintered body comprising a sintered niobium powder for capacitors comprising at least one element selected from the group consisting of neodymium, rhenium, lanthanum, erbium, ytterbium and lutetium.

19. A sintered body comprising a niobium granulated product as claimed in claim 16.

20. A capacitor comprising (i) an electrode comprising said niobium sintered body as claimed in claim 18 or 19, (ii) a dielectric formed on a surface of said electrode, and (iii) a counter electrode formed on said dielectric.

21. The capacitor as claimed in claim 20, wherein said dielectric comprises niobium oxide as a main component.

22. The capacitor as claimed in claim 21, wherein said niobium oxide is prepared by electrolytic oxidation.

23. The capacitor as claimed in claim 20, wherein said counter electrode comprises at least one material selected from the group consisting of an electrolytic solution, an organic semiconductor, and an inorganic semiconductor.

24. The capacitor as claimed in claim 20, wherein said counter electrode comprises an organic semiconductor, which comprises at least one material selected from the group consisting of an organic semiconductor comprising benzopyrroline tetramer and chloranil, an organic semiconductor comprising tetrathiotetracene as the main component, an organic semiconductor comprising tetracyanoquinodimethane as the main component, and an electroconducting polymer.

25. The capacitor as claimed in claim 24, wherein said electroconducting polymer is at least one selected from the group consisting of polypyrrole, polythiophene, polyaniline, and substituted compounds thereof.

26. The capacitor as claimed in claim 24, wherein said electroconducting polymer is prepared by doping a polymer comprising a repeat unit represented by general formula (1) or (2) with a dopant:

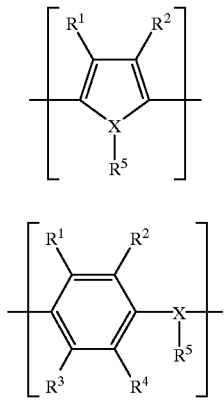

wherein $R^1$ to $R^4$ which may be the same or different, each independently represents a monovalent group selected from the group consisting of a hydrogen atom, a straight-chain or branched alkyl group, alkoxyl group, or alkylester group, having 1 to 10 carbon atoms, which may be saturated or unsaturated, a halogen atom, a nitro group, a cyano group, a primary, secondary or tertiary amino group, a $CF_3$ group, and a substituted or unsubstituted phenyl group, and $R^1$ and $R^2$, and $R^3$ and $R^4$ may independently form in combination a bivalent chain constituting a saturated or unsaturated hydrocarbon cyclic structure of at least one 3- to 7-membered ring together with carbon atoms undergoing substitution by combining hydrocarbon chains represented by $R^1$ and $R^2$ or $R^3$ and $R^4$ at an arbitrary position, in which a linkage of carbonyl, ether, ester, amide, sulfide, sulfinyl, sulfonyl, or imino may be included at an arbitrary position in the cyclic combined chain; X is an oxygen atom, a sulfur atom, or a nitrogen atom; and $R^5$, which is present only when X represents a nitrogen atom, is independently a hydrogen atom, or a straight-chain or branched alkyl group having 1 to 10 carbon atoms, which may be saturated or unsaturated.

27. The capacitor as claimed in claim 26, wherein said electroconducting polymer comprises a repeat unit represented by general formula (3):

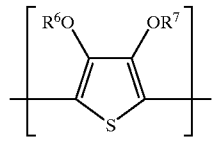

wherein $R^6$ and $R^7$ which may be the same or different, each independently represents a hydrogen atom, a straight-chain or branched alkyl group having 1 to 6 carbon atoms, which may be saturated or unsaturated, or a substituent group constituting a cyclic structure of a saturated hydrocarbon of at least one 5- to 7-membered ring including two oxygen atoms by combining the alkyl groups represented by $R^6$ and $R^7$ at an arbitrary position, in which a substituted or unsubstituted vinylene linkage or a substituted or unsubstituted phenylene structure may be included in the cyclic structure.

28. The capacitor as claimed in claim 27, wherein said electroconducting polymer comprising said repeat unit represented by formula (3) is poly(3,4-ethylenedioxythiophene).

29. The capacitor as claimed in claim 24, wherein said counter electrode comprises an organic semiconductor having a laminated structure.

30. The capacitor as claimed in claim 24, wherein said counter electrode is an organic semiconductor material which contains an organic sulfonic acid anion as a dopant.

31. A method for producing the niobium powder comprising nitrogen as claimed in claim 13, wherein the niobium powder is subjected to surface treatment using at least one process selected from the group consisting of liquid nitridation, ion nitridation and gas nitridation.

32. A method for producing the niobium powder comprising carbon as claimed in claim 13, wherein the niobium powder is subjected to surface treatment using at least one process selected from the group consisting of gas carbonization, solid-phase carbonization and liquid carbonization.

33. A method for producing the niobium powder comprising boron as claimed in claim 13, wherein the niobium powder is subjected to surface treatment using at least one process selected from the group consisting of gas boronization and solid-phase boronization.

34. A method for producing the niobium powder comprising sulfur as described in claim 13, wherein the niobium powder is subjected to surface treatment using at least one process selected from the group consisting of gas sulfidation, ion sulfidation and solid-phase sulfidation.

35. An electronic circuit comprising the capacitor as claimed in any one of claims 21 to 30.

36. An electronic instrument comprising the capacitor as claimed in any one of claims 21 to 30.

* * * * *